(12) United States Patent
Kishimoto

(10) Patent No.: US 10,762,357 B2
(45) Date of Patent: Sep. 1, 2020

(54) SHADING DEVICE AND IMAGE DISPLAY MODULE

(71) Applicant: Sakai Display Products Corporation, Osaka (JP)

(72) Inventor: Katsuhiko Kishimoto, Osaka (JP)

(73) Assignee: Sakai Display Products Corporation, Osaka (JP)

( * ) Notice: Subject to any disclaimer, the term of this patent is extended or adjusted under 35 U.S.C. 154(b) by 0 days.

(21) Appl. No.: 15/771,242

(22) PCT Filed: Apr. 14, 2017

(86) PCT No.: PCT/JP2017/015385
§ 371 (c)(1),
(2) Date: Apr. 24, 2019

(87) PCT Pub. No.: WO2018/189908
PCT Pub. Date: Oct. 18, 2018

(65) Prior Publication Data
US 2019/0258873 A1   Aug. 22, 2019

(51) Int. Cl.
*H04N 7/18* (2006.01)
*G06K 9/00* (2006.01)
(Continued)

(52) U.S. Cl.
CPC ............ *G06K 9/00791* (2013.01); *B60J 3/02* (2013.01); *B60J 3/0278* (2013.01); *B60R 1/00* (2013.01);
(Continued)

(58) Field of Classification Search
CPC ....... B60J 3/02; B60J 3/0278; B60R 11/0235; B60R 1/00; B60R 2011/0035;
(Continued)

(56) References Cited

U.S. PATENT DOCUMENTS 5,971,468 A * 10/1999 King ................... B60J 3/0204
296/97.5
10,562,378 B2 * 2/2020 Kishimoto ............... B60R 1/00
(Continued)

FOREIGN PATENT DOCUMENTS

JP       S60162029 U    10/1985
JP       H059836 A      1/1993
(Continued)

OTHER PUBLICATIONS

PCT International Search Report, PCT Application No. PCT/JP2017/015385, Japan Patent Office, dated May 23, 2017.
(Continued)

*Primary Examiner* — Md N Haque
(74) *Attorney, Agent, or Firm* — Snell & Wilmer L.L.P.

(57) ABSTRACT

A shading device comprises: a shading member; a display apparatus disposed on a surface of the shading member in such a manner that a display portion faces to an operator; an image pickup device to pick up, as an image, a region which an opposite surface of the surface faces, and generate image pickup data; and a data processing circuit to generate display image data, based on the image pickup data. An image display module comprises: a display apparatus to be disposed on a surface of a shading device in such a manner that a display portion faces an operator; an image pickup device to pick up, as an image, a region to which an opposite surface of the surface faces, and generate image pickup data; and a data processing circuit to generate display image data, based on the image pickup data.

13 Claims, 15 Drawing Sheets

(51) Int. Cl.
  *B60J 3/02* (2006.01)
  *B60R 1/00* (2006.01)
  *G09G 3/3208* (2016.01)
  *G02F 1/13* (2006.01)
(52) U.S. Cl.
  CPC .............. *G02F 1/13* (2013.01); *G09G 3/3208* (2013.01); *H04N 7/183* (2013.01); *B60R 2300/202* (2013.01); *B60R 2300/306* (2013.01); *B60R 2300/404* (2013.01); *G09G 2380/02* (2013.01); *G09G 2380/10* (2013.01)
(58) Field of Classification Search
  CPC ........ B60R 2300/202; B60R 2300/306; B60R 2300/404
  See application file for complete search history.

(56) References Cited

U.S. PATENT DOCUMENTS

| | | | | |
|---|---|---|---|---|
| 2006/0062570 | A1* | 3/2006 | Kikuchi | G03B 17/02 396/439 |
| 2010/0171588 | A1* | 7/2010 | Chutorash | G07C 9/00896 340/5.71 |
| 2014/0320952 | A1* | 10/2014 | Chen | G02B 27/0101 359/303 |
| 2016/0082888 | A1* | 3/2016 | Kothari | B60R 1/00 348/148 |

FOREIGN PATENT DOCUMENTS

| | | | |
|---|---|---|---|
| JP | H07234395 A | 9/1995 | |
| JP | H09179075 A | 7/1997 | |
| JP | H10329541 A | 12/1998 | |
| JP | 2003300414 A | 10/2003 | |
| JP | 2005122981 A | 5/2005 | |
| JP | 2005297762 A | 10/2005 | |
| JP | 2006091249 A | 4/2006 | |
| JP | 2009006893 A | 1/2009 | |
| JP | 2009029245 A | 2/2009 | |
| JP | 2009184554 A | 8/2009 | |
| JP | 2013019077 A | 1/2013 | |
| KR | 100939443 B1 | 1/2010 | |
| WO | 2017022172 A1 | 2/2017 | |
| WO | WO-2017022172 A1 * | 2/2017 | ............... G02B 5/30 |

OTHER PUBLICATIONS

English Translation of PCT International Search Report, PCT Application No. PCT/JP2017/015385, Japan Patent Office, dated May 23, 2017.

English Translation of the International Preliminary Report on Patentability, PCT Application No. PCT/JP2017/015385, dated Oct. 24, 2019.

* cited by examiner

SHADING DEVICE AND IMAGE DISPLAY MODULE

CROSS-REFERENCE TO RELATED APPLICATIONS

This patent application is a U.S. National Stage of PCT/JP2017/015385, filed 14 Apr. 2017.

TECHNICAL FIELD

The present invention relates to a shading device in which, on a display apparatus equipped on a surface facing an operator, an image of a region to which an opposite surface of the surface is oriented is displayed. The present invention also relates to an image display module in which, on a display apparatus to be equipped on a surface of a shading device that faces an operator during use thereof, an image of a region to which an opposite surface of the surface is oriented is displayed.

BACKGROUND ART

When being in a room, for example, inside a building, or inside a vehicle and sunlight directly comes into sight of a person, the glare of light can make it difficult to look squarely out the window or the occurrence of glare can make it difficult to ensure normal visibility. In such a case, a shading device is sometimes used to obstruct sunlight with a plate-shaped member having a certain size. By disposing a shading device close to a windshield and inside a vehicle compartment, for example, sunlight illuminating the interior of the vehicle compartment is obstructed, and the glare is reduced. For a shading device for automobile, for example, attempts are being made to combine a shading device, which is positioned in front of vehicular driver's eyes when in use, with another device. For example, Patent Document 1 discloses a shading device provided with a liquid crystal display apparatus as a display portion of a television set or a navigation system.

PRIOR ART DOCUMENT

Patent Document
Patent Document 1: JP H7-234395

SUMMARY OF THE INVENTION

Problems to be Solved by the Invention

As described above, by using the shading device, the glare by sunlight can be reduced. On the other hand, by using the shading device, a part of the field of vision from inside a vehicle compartment or the like is obstructed. Thus, blind spots can be created in the view outside the windshield that can be visible from inside. In particular, when the shading device for a vehicular driver seat is positioned in a use position, the blind spots often occur in an upper forward area of a vehicular driver. Thus, traffic lights or a road sign positioned above the vehicular driver's line of vision does not necessarily come in sight of the vehicular driver and the vehicular driver can overlook the traffic lights or a road sign.

Accordingly, an object of the present invention is to provide a shading device and an image display module capable of displaying, for an operator of the shading device, an image of a view comprising a portion that is obstructed by the shading device to provide a user with a field of vision with fewer blind spots during use of the shading device.

Means to Solve the Problem

A shading device of an embodiment of the present invention is characterized by comprising: a shading member, the shading member having a plate shape; a display apparatus disposed on a surface of the shading member, the surface being to face an operator during use of the shading member, in such a manner that a display portion faces the operator; an image pickup device to pick up, as an image, a region which an opposite surface of the surface faces, and generate image pickup data; and a data processing circuit to generate display image data to be displayed on the display portion during use of the shading member, based on the image pickup data that is generated by the image pickup device.

An image display module of an embodiment of the present invention is also characterized by comprising: a display apparatus to be disposed on a surface of a shading device, the surface being to face an operator during use of the shading device, in such a manner that a display portion faces the operator; an image pickup device to pick up, as an image, a region to which an opposite surface of the surface faces, and generate image pickup data; and a data processing circuit to generate display image data to be displayed on the display portion during use of the shading device, based on the image pickup data generated by the image pickup device.

Effect of the Invention

According to an aspect of the present invention, an image of a view comprising a portion that is obstructed by a shading device can be displayed to be facing an operator, and a field of vision with fewer blind spots can be provided for a user even during use of the shading device.

EMBODIMENT FOR CARRYING OUT THE INVENTION

Next, an embodiment of a shading device and an image display module of the present invention will be described with reference to the drawings. Materials and shapes of, and their relative positions or the like in the embodiment described below are merely illustrative. The shading device and the image display module of the present invention are not construed to be limitative thereto. In addition, a shading device of a first embodiment will be described next by way of example of a vehicular shading device attached near a front windshield. However, the shading device and the image display module of the present invention can be used in a variety of vehicles such as trains, ships and airplanes and a variety of buildings such as houses and office buildings.

First Embodiment

Figure 1:
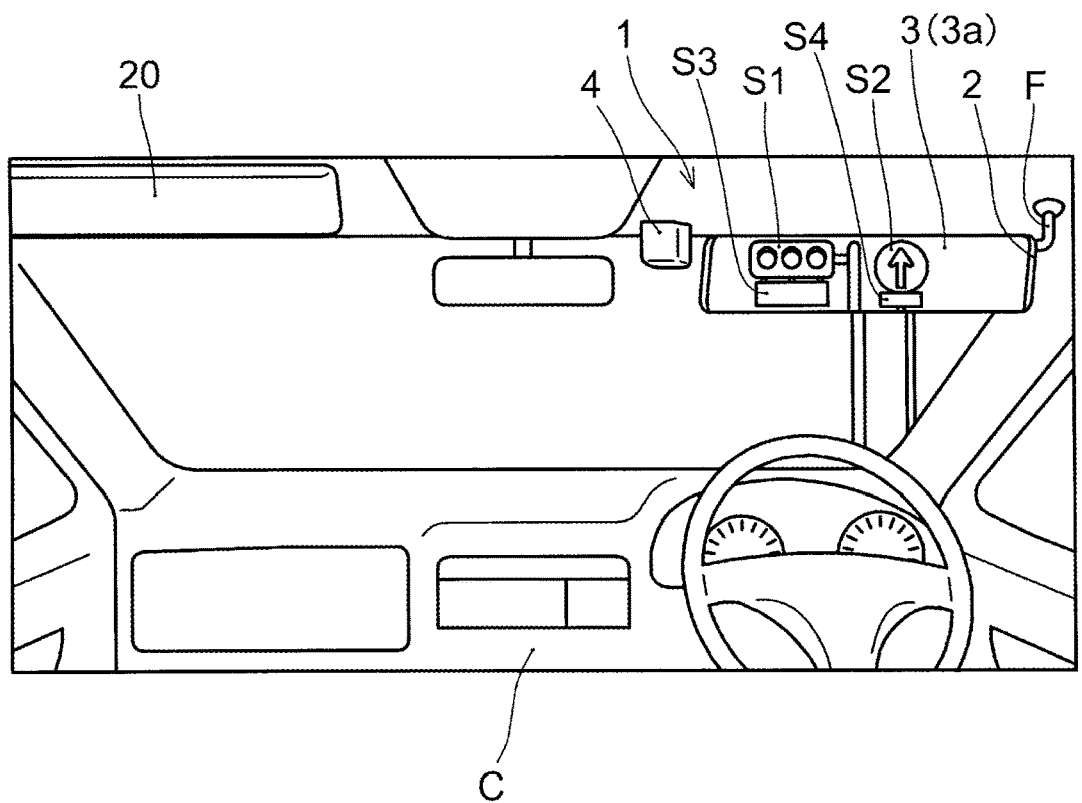
FIG. 1 shows a shading device according to a first embodiment of the present invention in a use position.
Figure 2:
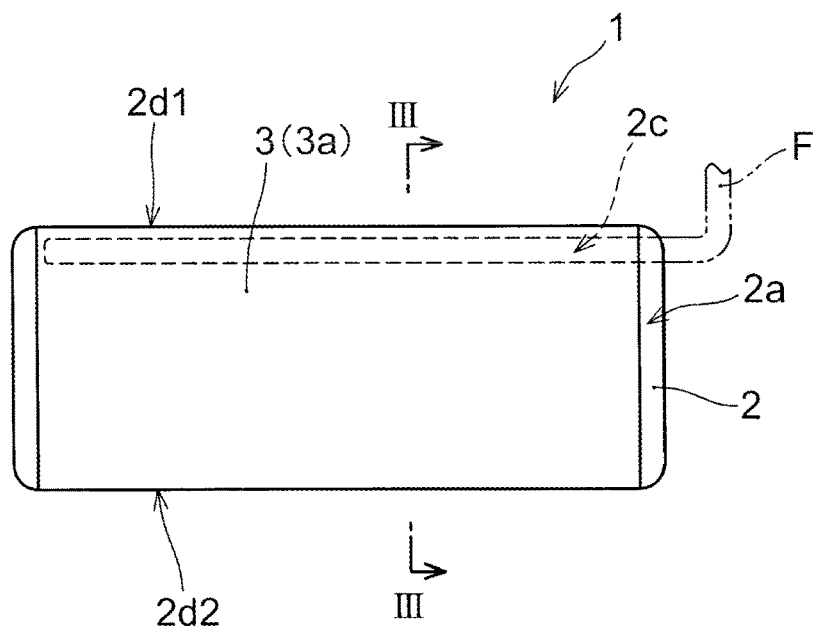
FIG. 2 shows a front view of a shading member of the shading device and a display apparatus according to the first embodiment.

In FIG. 1, it is shown that a shading device 1 of the first embodiment is disposed in the vehicle compartment of a motor vehicle C and is positioned in a use position. In the figure, it is also shown that, above a passenger seat of the motor vehicle C, a shading member 20 that can constitute a second shading device is present at a non-use position. In FIG. 2, a shading member 2 of the shading device 1 and a display apparatus 3 are shown, and, in FIG. 3, a sectional view along a line III-III of FIG. 2 is shown. In addition, in FIG. 4A and FIG. 4B, an image pickup region 41 to be picked up, as an image, by an image pickup device 4 of the shading device 1 is schematically shown.

As shown in FIG. 1 to FIG. 4B, the shading device 1 of the embodiment is provided with: a plate-shaped shading member 2; and a display apparatus 3 disposed, while a display portion 3a is facing an operator of the shading member 2 (that is, in the embodiment, a vehicular driver M), on a surface 2a facing the vehicular driver M during use of the shading member 2. The shading device 1 is further provided with an image pickup device 4 that picks up, as an image, a region which an opposite surface 2b of a surface 2a of the shading member 2 faces, and that generates image pickup data. In the following description, the "surface 2a" of the shading member 2 is also referred to as a "first surface 2a" of the shading member 2. In addition, the opposite surface 2b of the surface 2a is referred to as a "second surface 2b" of the shading member 2. The shading device 1 is further provided with a data processing circuit 5 (see FIG. 10) that generates display image data to be displayed on a display portion 3a of the display apparatus 3 during use of the shading member 2, based on the image pickup data generated by the image pickup device 4. Although not shown, the image pickup device 4 and the data processing circuit 5 are connected to each other in a wired or wireless manner so as to enable data transmission and reception. In addition, although, in FIG. 1, the image pickup device 4 is shown beside the shading member 2 for the sake of clarity, as shown in FIG. 4A, this image pickup device is preferably disposed at a position in which the vehicular driver M, the shading member 2, and the image pickup device 4 are arranged on a generally straight line in the longitudinal direction of the motor vehicle C.

In the following description, the "use" of the shading member 2 means that at least a part of the sunlight that can illuminate a region which the first surface 2a faces is obstructed by the shading member 2 by positioning the shading member 2 in a position in which a second surface 2b is illuminated by sunlight. In addition, the "use state" of the shading member 2 is a state in which the "use" of the shading member 2 is made, and "use position" of the shading member 2 is a position in which the shading member 2 is in the "use state".

The shading member 2, in an example shown in FIG. 1, is attached to the ceiling portion in the vehicle compartment of the motor vehicle C using a rod-shaped attaching member F bent in an L-shape. As shown in FIG. 1, on the display portion 3a of the display apparatus 3, an image in a front region which the second surface 2b (see FIG. 2) of the shading member 2 faces, that is, an image of the outside view over the front windshield of the motor vehicle C in the example of FIG. 1, is displayed. On the display apparatus 3, traffic lights S1, a road sign S2 indicative of "only this way to cruise", a guidance sign S3 indicative of an essential landmark, and an auxiliary sign S4 displaying "traffic restriction time" of the road sign S2 or the like are displayed. In Japan, as road signs, in addition to such a road sign and guidance sign, main signs comprising instructive signs indicative of specific permissions or instructions and alerting signs indicative of warnings or cautions; and auxiliary signs are set. According to the shading device 1 of the embodiment, the view that is obstructed by the shading member 2 is displayed on the display apparatus 3, so that the vehicular driver M can check these road signs or traffic lights without overlooking them even against sunlight.

The traffic lights S1 and road sign S2 that are displayed on the display apparatus 3 in FIG. 1 are essentially present at the positions within the field of vision of the vehicular driver M of the motor vehicle C in the position relationship between the motor vehicle C and the traffic lights S1 or the like in FIG. 1. Nevertheless, the region in which the traffic lights S1 or another road sign is present is covered with the shading member 2 that is positioned in the use position to obstruct sunlight. In the embodiment, however, the region which the second surface 2b of the shading member 2 faces can be picked up, as an image, by the image pickup device 4. In addition, based on the image pickup data generated by the image pickup device 4, the display image data to be displayed on the display apparatus 3 is generated by the data processing circuit 5. Consequently, the view to be viewed in the region covered with the shading member 2 is displayed, as an image, on the display apparatus 3 provided on the surface 2a (see FIG. 3) of the shading member 2 facing the vehicular driver M. Therefore, the vehicular driver M can clearly check letters or the like described on a guiding sign or an auxiliary sign, for example, even against sunlight.

Figure 4A:
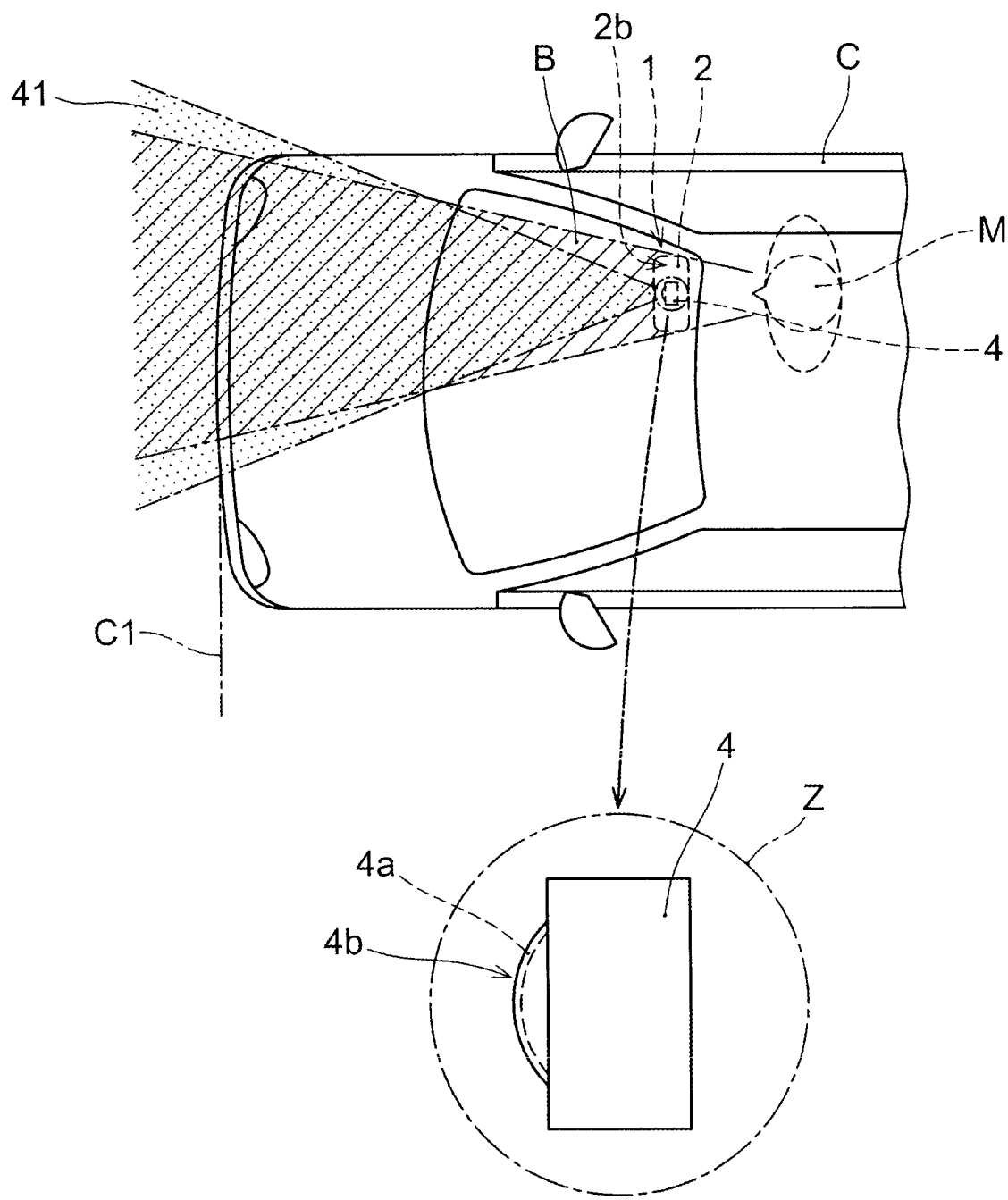
FIG. 4A schematically shows an example of a region picked up, as an image, by an image pickup device of the shading device according to the first embodiment, together with a blind spot portion of an operator.
Figure 4B:
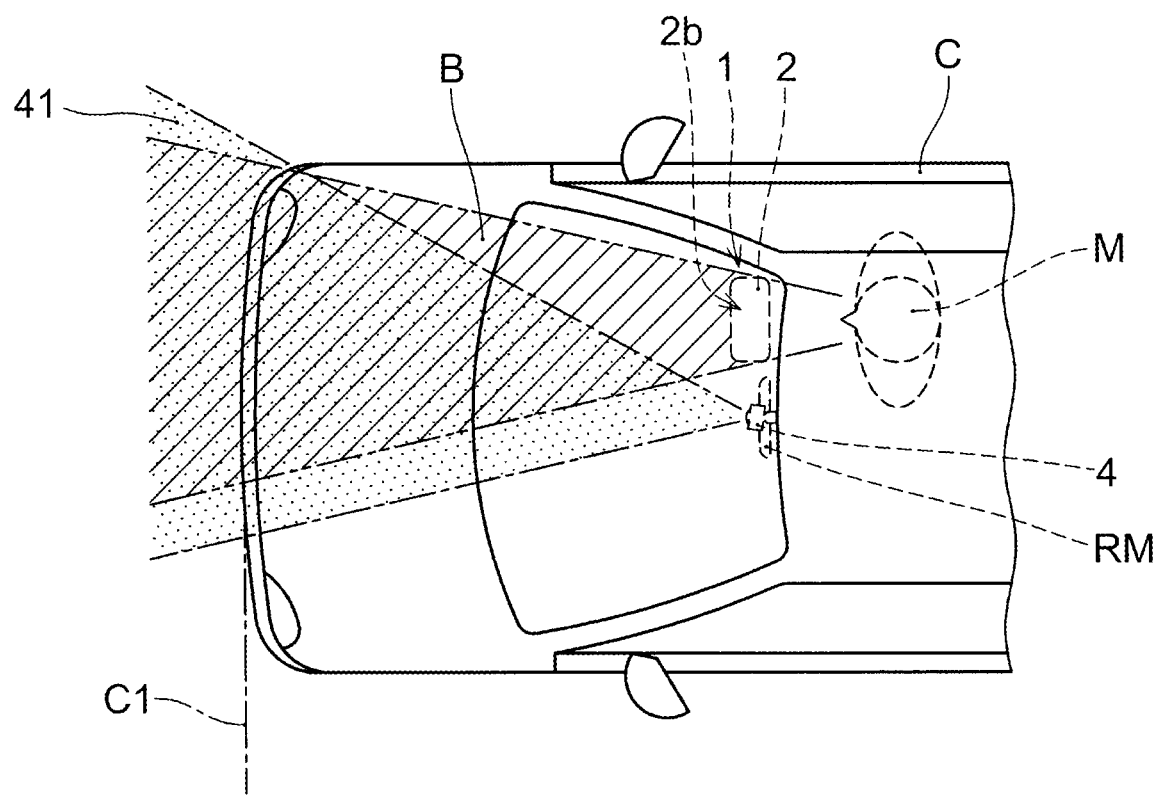
FIG. 4B schematically shows another example of a region picked up as an image by an image pickup device of the shading device according to the first embodiment, together with a blind spot portion of an operator.

That is, as shown in FIG. 4A and FIG. 4B, the image pickup device 4 is disposed in the motor vehicle C so as to pick up, as an image, an image pickup region 41 including a blind spot portion B obstructed by the shading member 2 of the field of vision of the vehicular driver M. The region including the blind spot portion B is picked up, as an image, by the image pickup device 4 thus disposed, and image pickup data is then generated. The display image data based on the image pickup data is generated by the data processing circuit 5 (see FIG. 10) and then are sent to the display apparatus 3. Consequently, an image of a view including a region in which the blind spot portion B can be produced can be displayed on the display apparatus 3 (see FIG. 1) for the vehicular driver M. The vehicular driver M can visually check, via the display apparatus 3, the view of the portion that is obstructed by the shading member 2. Thus, it is possible to reduce oversight of traffic lights or a road sign by the vehicular driver M under such a sunlight condition as the shading member 2 is used. It is considered that the shading device 1 of the embodiment can contribute to ensuring traffic safety.

In the shading member 20 provided above and in front of the passenger seat in the example shown in FIG. 1 as well, a display apparatus similar to the display apparatus 3 can be provided. That is, a second shading device comprising the shading member 20 and a display apparatus disposed on a surface facing the operator of the shading member 20 (for example, passenger at the passenger seat) during use thereof can be configured. In addition, on the display apparatus constituting the second shading device as well, the view in the region facing the surface opposite the surface on which the display apparatus in the shading member 20 is disposed can be displayed. In that case, a second image pickup device for the second shading device can be provided, and the second shading device can be provided with the constituent elements which are similar to those of the shading device 1. Therefore, the second shading device can have functions similar to those of the shading device 1, which will be described in further detail below.

In the embodiment, the image pickup device 4 is formed separately from the shading member 2, and is disposed inside the motor vehicle C. The image pickup device 4, as shown in FIG. 4A, preferably in the vicinity of an upper edge in the front windshield of the motor vehicle C, is disposed in a position in which the vehicular driver M, the shading member 2, and the image pickup device 4 are arranged on a generally straight line in the longitudinal direction of the motor vehicle C. The image pickup device 4, as shown in FIG. 4B, can also be disposed at a center in the transverse direction of the front windshield of the motor vehicle C (in the widthwise direction of the motor vehicle C), for example, toward a back surface of a rearview mirror RM (the surface facing the front of the motor vehicle C). As shown in FIG. 4A and FIG. 4B, the image pickup device 4, for example, distantly at a more significant front position than a front end C1 of the motor vehicle C, is disposed so that the entirety of the blind spot portion B is included in an image pickup region 41. For example, a camera or the like provided with a lens having an angle of view capable of bringing such image pickup region 41 is used as the image pickup device 4. Alternatively, the image pickup device 4 is disposed in a position at an angle suitable to obtain such image pickup region 41. As shown in FIG. 4A, if the shading member 2 and the image pickup device 4 are disposed so that the vehicular driver M, the shading member 2, and the image pickup device 4 are arranged on the generally straight line, the blind spot portion B can be easily included in the image pickup region 41 even by the image pickup device 4 provided with a lens having a small angle of view.

The image pickup device 4 is not construed to be limitative to the positions shown in FIG. 4A and FIG. 4B, and can be disposed in an arbitrary position in which it is possible to obtain an appropriate image pickup region 41. For example, the image pickup device 4 can be disposed in the vicinity of an edge in the transverse direction of the front windshield of the motor vehicle C or on a dashboard (not shown). It is preferable that antifouling coating using a photocatalyst effect such as titanium oxide be applied to at least a surface facing the outside of the vehicle of a portion facing the image pickup device 4 of the front windshield. The image pickup device 4 can also be disposed on the second surface 2b of the shading member 2. As described later, however, the shading member 2 can be used at an arbitrary position (angle) and thus it is preferable that the image pickup device 4 be disposed to be supported by an object other than the shading member 2 in terms of securing a stable image pickup region 41.

The image pickup device 4 is not construed to be limitative in particular as long as it is possible to pick up, as an image, a view of a desired image pickup region and then generate image pickup data in a format that can be processed by the data processing circuit 5. As the image pickup device 4, for example, a digital camera or the like having a CCD image sensor or a CMOS image sensor is exemplified. For each microarea, the optical energy based on a view in an image pickup region is converted to electrical signals by light receiving elements disposed in a matrix inside the CCD image sensor or the like, and the image pickup data based on these electrical signals is generated. Preferably, a camera or the like having an image sensor capable of color imaging is used as the image pickup device 4.

In FIG. 4A, in a circle Z indicated by a dashed line, the image pickup device 4 is schematically shown in an enlarged manner. The image pickup device 4 of the shading device 1 of the embodiment is provided with a lens 4b having a surface on which a coating layer 4a to reduce reflection of light by adjusting a refractive index is formed. The image pickup device 4 picks up, as an image, a view of a region which the second surface 2b illuminated by sunlight during use of the shading member 2 faces. Therefore, the image pickup device 4 requires image pickup against sunlight. The coating layer 4a is thus provided in the lens 4b of the image pickup device 4. Owing to the coating layer 4a, an occurrence of flare or ghosting, which is likely to occur in image pickup against sunlight, can be suppressed. The coating layer 4a can be formed by forming a number of nano-sized, wedge-shaped structures on a surface of the lens 4b or forming a layer of nano-sized particulates on the surface of the lens 4b. The image pickup device 4 does not always need to be provided with the lens having the coating layer 4a.

Again, referring to FIG. 2 and FIG. 3, the shading member 2 and the display apparatus 3 will be described in further detail. The shading member 2 is formed in a plate-like shape, and has a substantially rectangular shape as a whole in the first surface 2a and the second surface 2b. In the vicinity of one end edge 2d1 of two end edges 2d1, 2d2 that are substantially parallel to a longitudinal direction in the shading member 2, an insertion hole 2c for engaging with a rod-like attaching member F is provided along the end edge 2d1. The shading member 2 is attached to the motor vehicle C via the attaching member F so that, during use of the shading member 2, the end edge 2d1 is present at an upper end thereof.

In addition, in the embodiment, the shading member 2 comprises curved surface portions 2e1, 2e2 in the vicinity of two end edges 2d1, 2d2, respectively. That is, during use of the shading member 2, the shading member 2 comprises the curved surface portions 2e1, 2e2 at an edge facing an upper end thereof and at an edge facing a lower end thereof. The first surface 2a of the shading member 2 is a curved surface curving in a convex shape toward each of the end edges 2d1, 2d2 in the curved surface portions 2e1, 2e2. It is preferable that a curvature radius (R1) of each of the curved surface portions 2e1, 2e2 be 5 mm or more and 20 mm or less. In addition, in place of the one in which only the end edge curves, as described later, the shading member 2 can have a curved surface as a whole in the first surface 2a (see FIG. 5). The shading member 2 does not always need to have the curved surface portions 2e1, 2e2. Further, during use of the shading member 2, this shading member can be provided with a curved surface portion only at an edge facing an upper end thereof or an edge facing a lower end thereof. The shading member 2 is formed using a synthetic resin such as urethane, for example. However, any material for the shading member 2 suffices as long as it is possible to obstruct transmission of light even if the amount of light obstructed is small, and the material for the shading member 2 is not construed to be limitative to the synthetic resin. Further, the shape of the shading member 2 is not construed to be limitative to the rectangular shape as a whole, and the shading member 2 can have an arbitrary shape.

Figure 3:
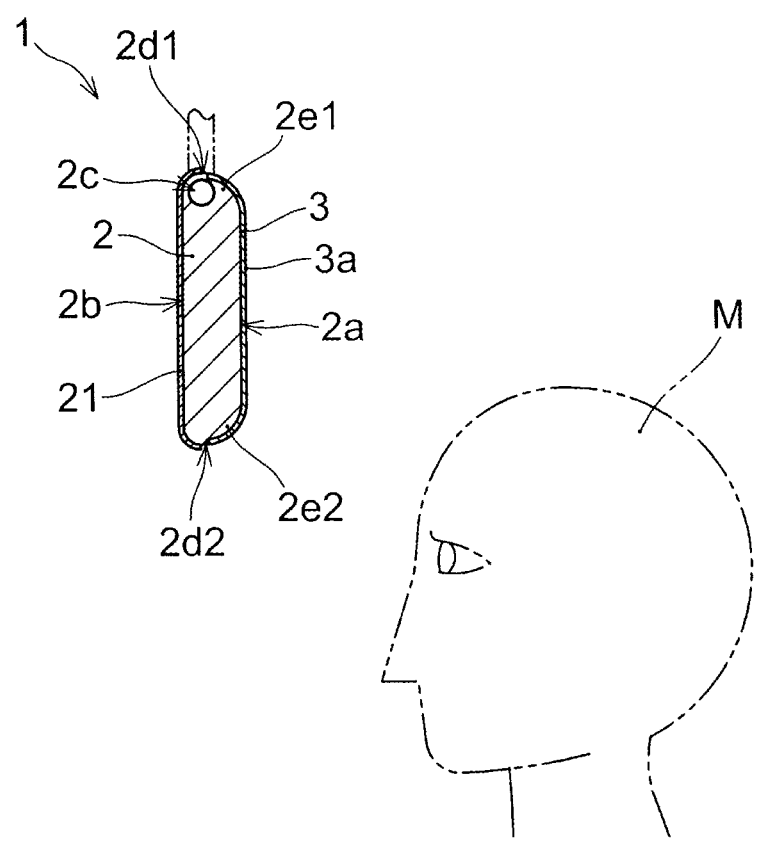
FIG. 3 shows a cross-sectional view along a line of FIG. 2.

The second surface 2b of the shading member 2 is exposed to sunlight during use of the shading member 2. On the first surface 2a of the shading member 2, the display apparatus 3 is disposed. In an electronic apparatus used as the display apparatus 3, in particular, in an organic EL display panel or the like which is preferably used as the display apparatus 3 of the shading device 1 of the embodiment, which will be described later, luminance decreases with a temperature increase, and further, decreasing of luminance over time can advance with the temperature increase. Therefore, it is preferable that appropriate measures to reflect the infrared ray included in sunlight be taken for the second surface 2b of the shading member 2. In addition, in a case where the shading member 2 is formed using a synthetic resin or the like, the shading member 2 is used less often while the material is exposed, and additional ornamentation is applied to the surface of the shading member 2. In the embodiment in particular, it is preferable that at least ornamentation be applied to the second surface 2b that is a surface on which the display apparatus 3 in the shading member 2 is not disposed. From these points of view, it is preferable that at least the second surface 2b of the shading member 2 be provided with an infrared-ray reflective member 21, which is capable of reflecting infrared-ray as shown in FIG. 3. Further, it is further preferable that the infrared-ray reflective member 21 include a material having ornamentation property such as natural or synthetic leather, or cloth made of pile fabric such as moquette.

As the infrared-ray reflection member 21, a coating film formed by infrared-ray reflective paint including a pigment having a high reflection index relative to infrared-ray is exemplified. Such infrared-ray reflective paint can also comprise hollow beads made of titanium oxide or ceramics having absorbency of infrared-ray and property of randomly reflecting infrared-ray. Such infrared-ray reflective paint is applied to at least the second surface 2b of the shading member 2, and the infrared-ray reflective member 21 can be thereby provided. In addition, such infrared-ray reflective paint is applied to natural or synthetic leather or cloth made of pile fabric, and the infrared-ray refection member 21 comprising a leather material or cloth is thereby formed, and the infrared-ray reflective member 21 can be attached to the surface of the shading member 2. Further, in a case where the surface of the shading member 2 is ornamented with a material comprising cloth, the cloth can be kneaded with beads such as ceramics. The cloth can be cloth woven with ceramics-woven yarn or can be cloth woven with yarn having a star-shaped or cross-shaped cross-sectional shape, which is suitable for randomly reflecting infrared-ray.

Figure 10:
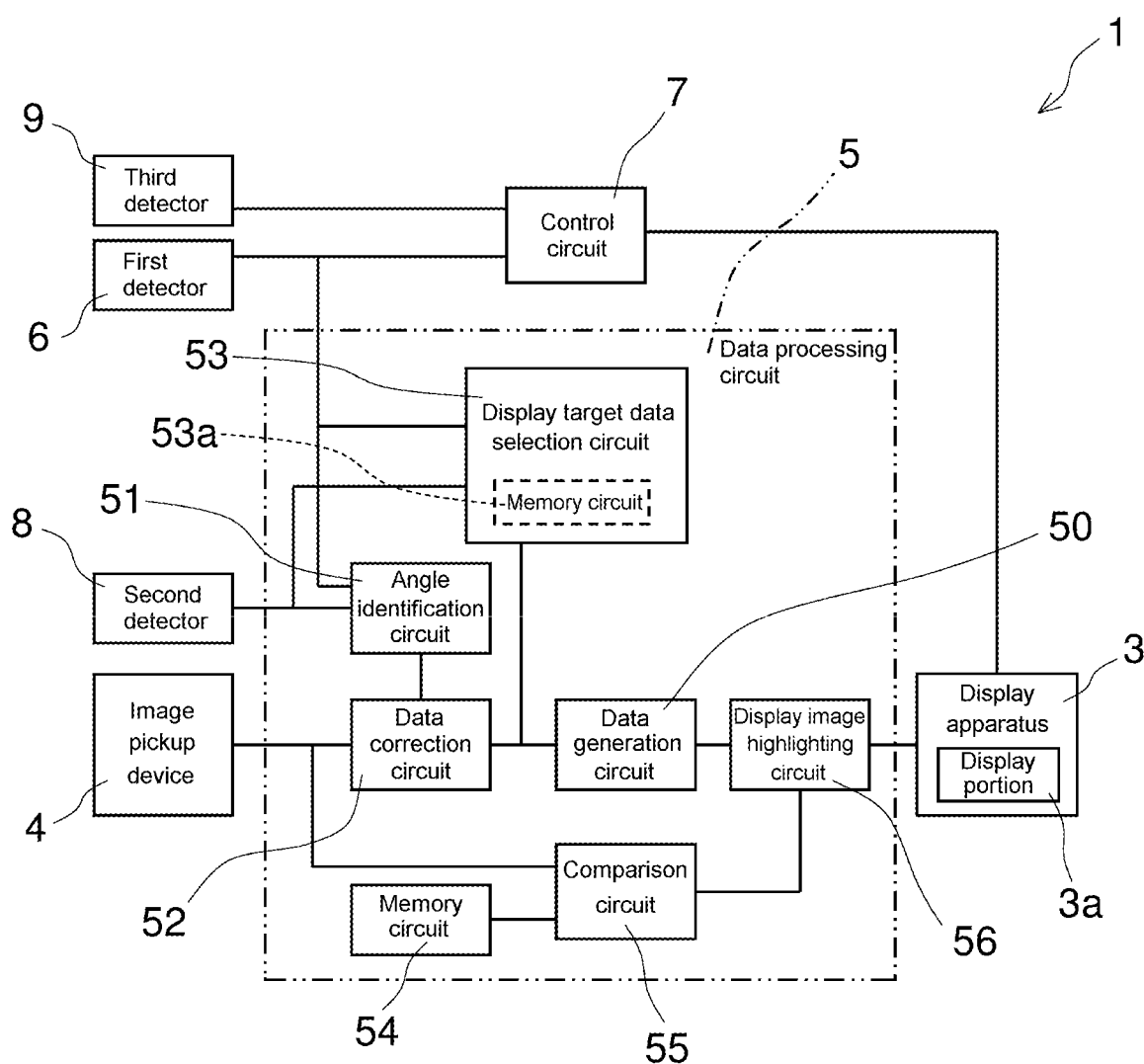
FIG. 10 shows a block diagram of essential constituent elements of the shading device according to the first embodiment.

The display apparatus 3 causes the display portion 3a to display an image based on the display image data generated by the data processing circuit 5 (see FIG. 10). Although the display apparatus 3 is not construed to be limitative in particular as long as it has such a function and can be disposed on the surface 2a of the shading member 2, it is preferable that the display apparatus 3 be an organic EL display panel or a liquid crystal display panel that can have a thin shape. In an example shown in FIG. 2, the display apparatus 3 is provided across the entire first surface 2a other than a proximal portion of two short edges of the shading member 2. In addition, almost all of the surfaces exposed to the first surface 2a of the shading member 2 in the display apparatus 3 constitute the display portion 3a.

Figure 5:
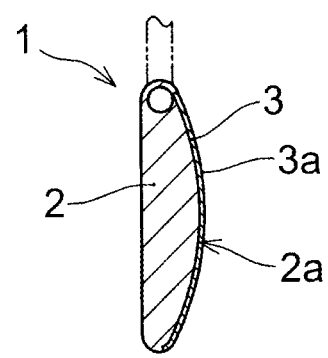
FIG. 5 shows another example of a shape of the shading member in the shading device according to the first embodiment of the present invention.

In the embodiment, the display apparatus 3 is formed along the curved surfaces of the curved surface portions 2e1, 2e2 of the shading member 2 in the two curved surface portions 2e1, 2e2 of the shading member 2, respectively. The curvature radius (R1) of each of the curved surface portions 2e1, 2e2 is 10 mm, for example. The display apparatus 3 is thus formed along the curved surface portions 2e1, 2e2, so that, in a case where a vehicular driver sees the display apparatus 3 in an oblique direction relative to the first surface 2a of the shading member 2, the vehicular driver can secure good visibility in comparison with a case in which the display apparatus 3 is not formed along the curved surfaces of the curved surface portions 2e1, 2e2. The first surface 2a of the shading member 2, unlike the shape shown in FIG. 3, can be curved across the entire surface as shown in FIG. 5. The curvature radius (R2) of the first surface 2a in this case is preferably 50 mm or more and 250 mm or less, and R2=150 mm, for example. At the first surface 2a that is thus curved across the entire surface as well, relatively good visibility is secured when the vehicular driver M sees the display apparatus 3 in an oblique direction. An advantage that the shading member 2 comprises a curved surface portion will be described later in detail.

Figure 6:
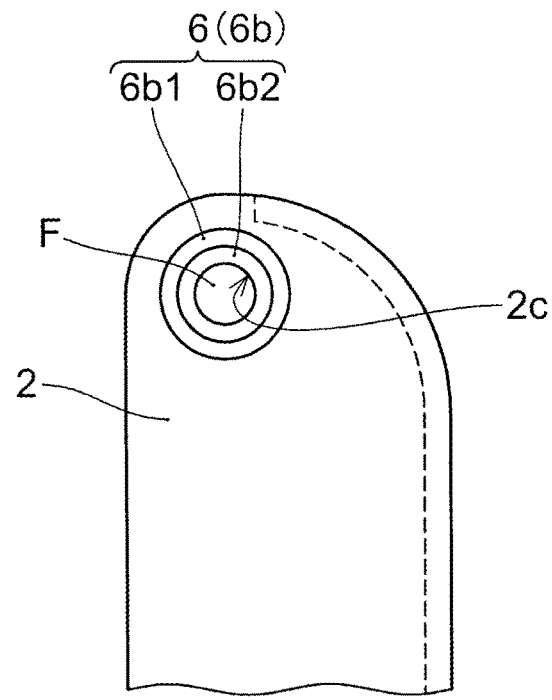
FIG. 6 shows an example of a first detector of the shading device according to the first embodiment.

The shading device 1 of the embodiment, as shown in FIG. 6, can be provided with a detector (first detector 6) that detects a position of the shading member 2. The first detector 6 detects at least the position of the shading member 2 so as to identify a use position and a non-use position of the shading member 2. Also, the first detector 6 preferably detects the position of the shading member 2 by detecting an angle of the first surface 2a of the shading member 2 (for example, an angle relative to the line of vision of the vehicular driver M).

In FIG. 6, as an example of the first detector 6, an angle sensor 6b is shown. In an example of FIG. 6, the angle sensor 6b is a rotation angle detection sensor using a rotary potentiometer. The angle sensor 6b of FIG. 6 comprises: a movable portion 6b1 attached together with the shading member 2 and rotating about the attaching member F; and a stationary portion 6b2 fixed to the attaching member F, and is disposed around the insertion hole 2c into which the attaching member F is to be inserted. The angle sensor 6b detects an angle of the shading member 2, that is, a position in the rotating direction, by detecting a positional difference in a circumferential direction about the attaching member F between the stationary portion 6b2 and the movable portion 6b1 rotating together with the shading member 2.

Figure 7A:
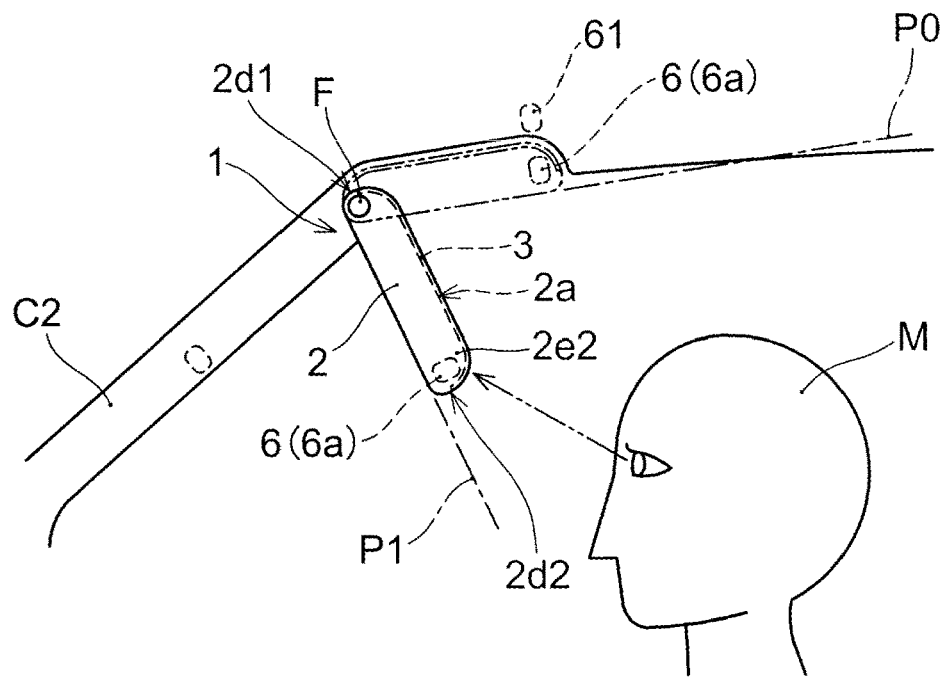
FIG. 7A shows an example of a use state of the shading device according to the first embodiment.
Figure 7B:
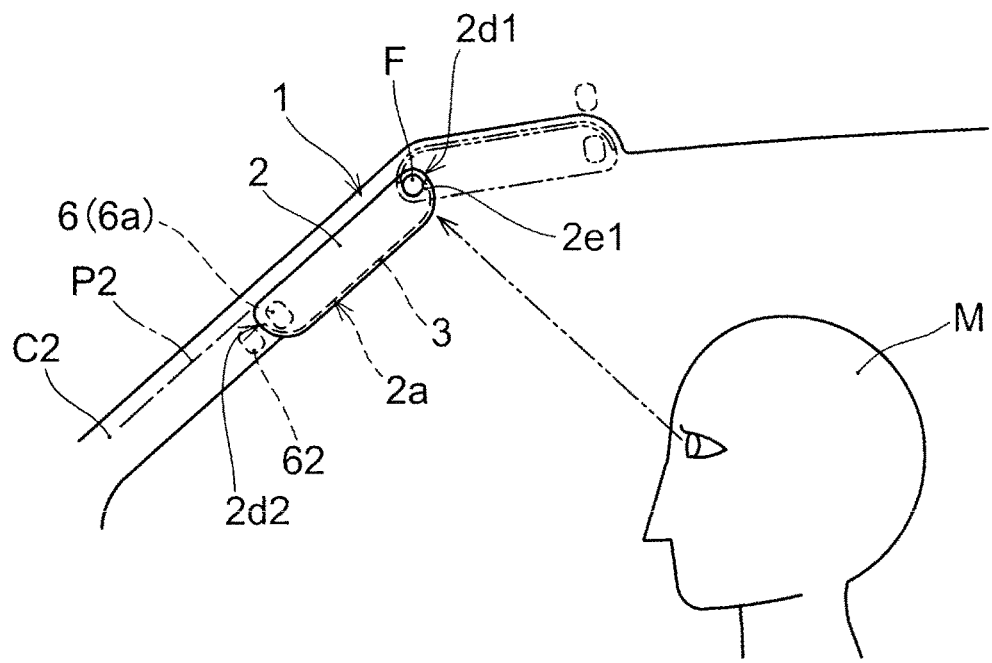
FIG. 7B shows another example of the use state of the shading device according to the first embodiment.

In examples shown in FIG. 7A and FIG. 7B, the shading member 2 is provided with a magnetic sensor 6a as a first detector 6 in the vicinity of an end edge 2d2 opposite an end edge 2d1 at which the insertion hole 2c (see FIG. 3) is provided at the vicinity thereof. In FIG. 7A and FIG. 7B, an example of the use position of the shading member 2 as a side view of the vehicular driver M is shown. The shading member 2 is linked to the attaching member F in a rotatable manner. The shading member 2 is rotated about the attaching member F, and is thereby positioned from a non-use position P0 which is a non-use position to a use position P1 in FIG. 7A or a use position P2 in FIG. 7B.

In addition, when the shading member 2 is present at the non-use position P0, a magnet 61 is disposed at a position proximal to a magnetic sensor 6a. Further, when the shading member 2 is present at the farthest position rotated from the non-use position P0 about the attaching member F (use position P2 in FIG. 7B in the examples of FIG. 7A and FIG. 7B), a magnet 62 is disposed at a position proximal to the magnetic sensor 6a. The magnets 61, 62 can be disposed on a surface of the ceiling interiors or the back thereof, or on a surface of or inside a pillar C2.

The magnets 61, 62 are disposed while a same magnetic pole (N-pole or S-pole) is facing the magnetic sensor 6a, for example. The magnetic sensor 6a moves in a magnetic field produced by the magnet 61 and the magnet 62 concurrently with rotating of the shading member 2. The magnetic sensor 6a detects the orientation and intensity of the magnetic field in its own position, and electrically outputs a result of the detection, for example. The magnetic sensor 6a and the magnets 61, 62 are used to be thereby enable that whether the shading member 2 is present at the non-use position P0 or at a given use position, for example, at the use position P2, to be detected. The magnetic sensor 6a can be configured with a Hall element or merely with a magnetic coil or the like, for example. It suffices that the first detector 6 be capable of detecting a position of the shading member 2 without being construed to be limitative to the example shown. For example, a magnet can be disposed at the position of the magnetic sensor 6a in FIG. 7A and FIG. 7B or a magnetic sensor can be provided as the first detector 6 in each of the positions of the magnets 61, 62. Either one only of the magnets 61, 62 can also be disposed.

In a case where the first detector 6 is provided, the shading device 1 is preferably provided with a control circuit 7 (see FIG. 10) connected to the first detector 6. The control circuit 7 determines at least whether the shading member 2 is present at a use position based on a result of detection of the first detector 6. Then, based on the determination, this circuit controls the ON/OFF state of the display apparatus 3. For example, if the result of detection of the first detector 6 shows that the shading member 2 is present at a position farther away from the non-use position P0 than a given position, the control circuit 7 determines that the shading member 2 is present at a use position. Then, in a case where the display apparatus 3 is present in the OFF state at that time, the control circuit 7 controls the display apparatus 3 to turn to the ON state, and causes the display portion 3a to display an image. Alternatively, if the result of detection of the detector 6 shows that the shading member 2 is nearer to the non-use position P0 than to the given position, the control circuit 7 determines that the shading member 2 is present at the non-use position. Subsequently, in a case where the display apparatus 3 is present in the ON state, the control circuit 7 controls the display apparatus 3 to turn to the OFF state, and image display on the display portion 3a can be stopped. The shading device 1 comprises such a configuration, whereby the vehicular driver M can cause the display apparatus 3 to display an image or stop the display merely by operating the shading member 2. The first detector 6 is not construed to be limitative to the magnetic sensor 6a or the angle sensor 6b, and can be an arbitrary detector such as a gravity sensor capable of detecting an event which varies based on the position (angle) of the shading member 2. The first detector 6 does not have to be provided. That is, ON/OFF control of the display apparatus 3 can be performed by the operator of the shading member 2.

Referring to FIG. 7A and FIG. 7B, an advantage that the shading member 2 comprises a curved surface portion will be described below. In a case where the shading member 2 is present at the use position P1, it follows that the vehicular driver M sees the display apparatus 3 in an oblique direction relative to the first surface 2a of the shading member 2. In that case, the shading member 2 does not have the curved surface portion 2e2 and consequently if there is no portion of the display apparatus 3 along the curved surface of the curved surface portion 2e2, the vehicular driver M can see only a portion of the display apparatus 3 facing an oblique direction relative to the vehicular driver M. However, the shading member 2 of the embodiment comprises the curved surface portion 2e2, and the display apparatus 3 is formed along the curved surface of the curved surface portion 2e2. Thus, the vehicular driver M can see an image displayed in a region including a portion perpendicular to the line of vision of the vehicular driver M even in the vicinity of the end edge 2d2. In comparison with a case in which the curved surface portion 2e2 is absent, the visibility relative to the display apparatus 3 of the vehicular driver M is higher.

In addition, in a case where the shading member 2 is present at the use position P2 as well, it follows that the vehicular driver M sees the display apparatus 3 in an oblique direction relative to a normal line of the first surface 2a of the shading member 2. In the embodiment, the shading member 2 comprises the curved surface portion 2e1, and the display apparatus 3 is formed along the curved surface of the curved surface portion 2e1 and, thus, in the vicinity of the end edge 2d1 as well, the vehicular driver M can see the image displayed in the region including the portion perpendicular to the line of vision of the vehicular driver M. In comparison with a case in which the curved surface portion 2e1 is absent, the visibility relative to the display apparatus 3 of the vehicular driver M is higher.

Thus, the shading member 2 comprises the curved surface portions 2e1, 2e2, and the display apparatus 3 is formed along the respective curved surfaces of the curved surface portions 2e1, 2e2, and good visibility of the vehicular driver M is secured. Specifically, it is considered that a curved surface portion (curved surface portion 2e1 or curved surface portion 2e2) on an end surface closer to the vehicular driver M of the end edges 2d1, 2d2 mainly contributes to securing the visibility of the vehicular driver M. The vehicular driver M is prone to carelessly operate the shading surface 2a. Therefore, the shading member 2 is used at an arbitrary position in a state in which the first surface 2s is inclined relative to the vehicular driver M. It is preferable that the shading member 2 have at least curved surface portions such as the curved surface portion 2e1 and curved surface portion 2e2 in the vicinity of either one of the end edge 2d1 and the end edge 2d2. An advantageous effect of improvement in visibility as described previously can be achieved. It is further preferable that the shading member 2 have curved surface portions such as the curved surface portion 2e1 and the curved surface portion 2e2 in the vicinity of each of the end edge 2d1 and the end edge 2d2. Further, although the display apparatus 3 can be a liquid crystal display panel as described previously, an organic EL display panel capable of having more flexibility than the liquid crystal display panel is preferable as the display apparatus 3. An organic EL display panel formed using a flexible film having a surface on which an organic material has been laminated is preferable as the display apparatus 3 in particular.

Figure 8:
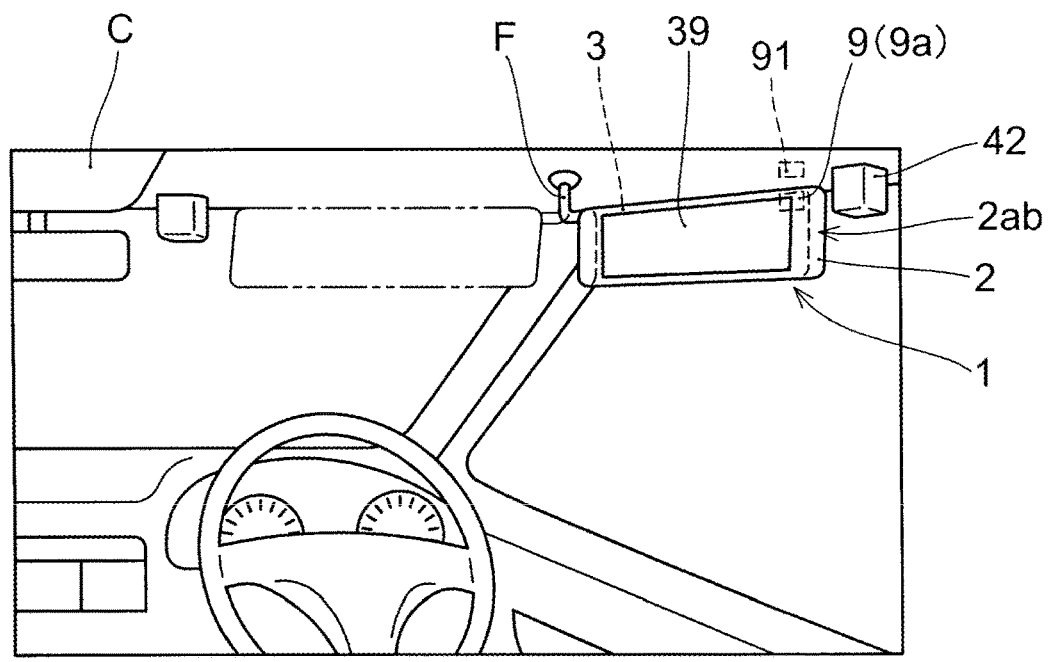
FIG. 8 shows an example of another use state of the shading device according to the first embodiment.

The shading member 2 can be attached to the motor vehicle C so as to be able to obstruct sunlight illuminating the vehicular driver's side windshield on the vehicular driver's side door as well. That is, as shown in FIG. 8, this shading member can be attached to the motor vehicle C on the ceiling portion of the vehicle compartment via the attaching member F that is rotatably attached thereto. In order to deal with the use mode as shown in FIG. 8, the shading device 1 can be provided with an additional detector (a third detector 9) that detects the position of the shading member 2. The third detector 9 detects the position of the shading member 2 in a direction different from a direction of a position change of the shading member 2 that the first detector 6 (see FIG. 6) can detect. In FIG. 8, a magnetic sensor 9a is exemplified as the third detector 9.

The magnetic sensor 9a is disposed in the vicinity of an end in a radial direction in rotating of the attaching member F in the shading member 2. In addition, a magnet 91 is disposed at a position proximal to the magnetic sensor 9a when the shading member 2 is moved by rotating of the attaching member F so as to cover a portion of the vehicular driver's side windshield on the vehicular driver's side door. The magnet 91 can be disposed on a surface of the ceiling interiors or a surface of the interiors at an upper portion of the side door frame, or on the back thereof, for example.

The magnetic sensor 9a functions similarly to the magnetic sensor 6a described previously. That is, the magnetic sensor 9a detects a position in the rotating direction of the attaching member F with respect to the shading member 2, based on the intensity of the magnetic field produced by the magnet 91. Then, the control circuit 7 (see FIG. 10) determines, based on a result of detection of the third detector 9, which of the front windshield and the side windshield the shading member 2 is used for. For example, if the result of detection of the third detector 9 shows that the shading member 2 is closer to the side windshield than a given position, the control circuit 7 determines that the shading member 2 is used for the side windshield. In addition, in a case where the display apparatus 3 is present at the ON state at that time, the control circuit 7 controls the display apparatus 3 to turn to the OFF state, and stops image display. In this case, the control circuit 7 can control the display apparatus 3 to turn to the OFF state based on only the result of detection of the third detector 9 irrespective of the result of detection of the first detector 6 described previously.

The shading device 1 of the embodiment can also be provided with a second display apparatus 39 on a surface 2ab of the shading member 2 that faces an operator (vehicular driver) in a use position as shown in FIG. 8, and can be further provided with a second image pickup device 42 that picks up, as an image, a region which a surface opposite the surface 2ab of the shading member 2 faces, and that generates image pickup data. In addition, when the third detector 9 detects that rotating about a shaft (rotating shaft of the attaching member F) different from a rotating shaft of the shading member 2 along the front windshield has been performed, the second display apparatus 39 can be controlled to turn to the ON state, causing a display portion of the display apparatus 39 to display an image based on the image pickup data generated by the second image pickup device 42. It is possible to cause the vehicular driver to visually recognize a view of a blind spot portion that can be produced in the use position of the shading member 2 shown in FIG. 8. In this case also, the control circuit 7 can control the second display apparatus 39 to turn to the ON state, or can control the display apparatus 3 to turn to the OFF state, the display apparatus being disposed on a surface facing the side windshield in the shading member 2.

The second display apparatus 39 is exposed to sunlight when the shading member 2 is used for the front windshield. Thus, it is preferable that an infrared-ray reflective layer or an infrared-ray absorbent layer formed of a transparent material be formed on a surface (display screen) of the second display apparatus 39. By using such a configuration, deterioration of the second display apparatus 39 that is caused by heat can be suppressed. The infrared-ray reflective layer is formed using antimony-doped tin oxide (ATO) or tin-doped indium (ITO), for example. A vehicle comprising ATO or ITO nano-particle dispersant is applied to a surface of the display apparatus 39, for example, and the infrared-ray reflective layer can be thereby formed. Although the particle size of the nano-particle dispersant is not construed to be limitative in particular, the size is preferably 20 nm or more and 50 nm or less. The infrared-ray absorbent layer can also be formed using nano-particle dispersant of cesium-oxide tungsten, for example. In addition, it is further preferable that the infrared-ray reflective layer and the infrared-ray absorbent layer have an ultraviolet absorption function. Even in a case where the second display apparatus 39 comprises an organic material which is easily influenced by ultraviolet-ray, image deterioration can be prevented.

Thus, the control circuit 7 can control the ON/OFF state of the display apparatus 3 based on the result of detection of the third detector 9 as well as the first detector 6. Unnecessary image display directed outward from the motor vehicle C can be prevented. The third detector 9 can be an angle sensor disposed at an engaging portion between the attaching member F and the ceiling portion, like those exemplified in FIG. 6 with respect to the first detector 6. In addition, only the third detector 9 can be provided in place of providing the first detector 6.

Figure 9:
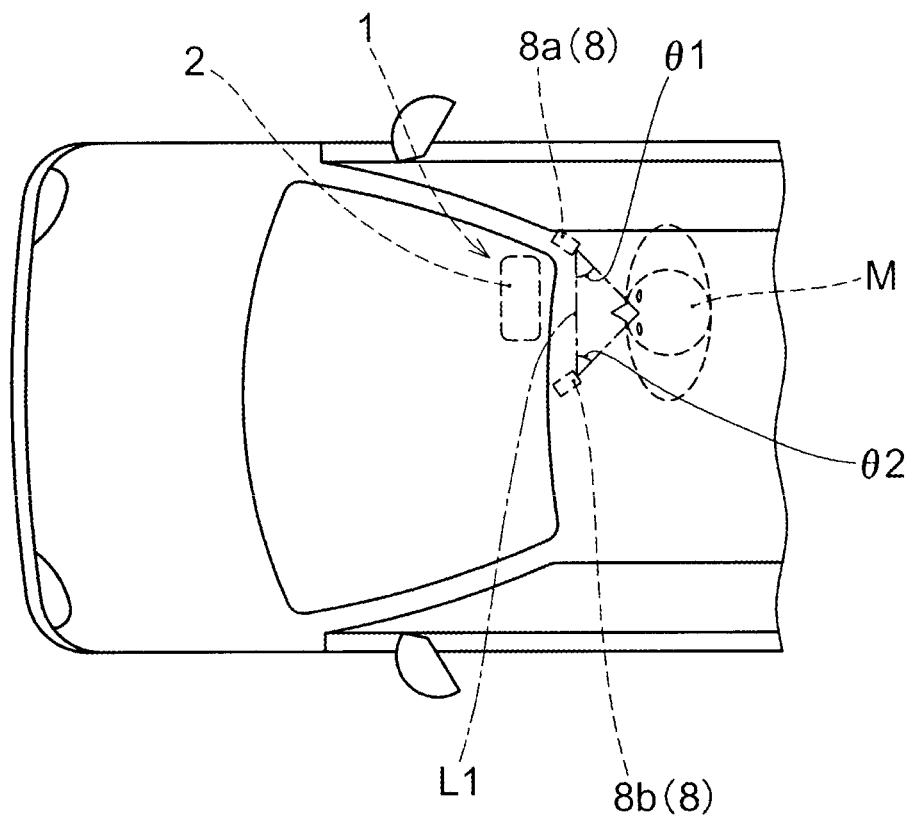
FIG. 9 shows an example of a second detector of the shading device according to the first embodiment.

The shading device 1 of the embodiment can be further provided with a detector (second detector 8) that detects positions of the eyes of the vehicular driver M. The second detector 8, as shown in FIG. 9, is composed of eye detection cameras 8a, 8b respectively installed in two known positions and an analyzing device (not shown) that analyzes acquired images of the eye detection cameras 8a, 8b, for example. The eye detection cameras 8a, 8b are provided with a far infrared-ray sensor, and generate temperature data of each portion in an image pickup region. Eyeballs of an ordinary person are characterized in that they have a lower temperature than any other portion in the face. The analyzing device (not shown) specifies a facial position and positions of the eyes of the vehicular driver M in the acquired images by the eye detection cameras 8a, 8b, based on the temperature data generated by the eye detection cameras 8a, 8b. A general digital camera is used as the eye detection camera 8a, 8b, and the positions of the eyes can be specified by image recognition in the analyzing device (not shown).

The positions of the eyes of the vehicular driver M in the acquired images of the eye detection cameras 8a, 8b are specified, and angles θ1, θ2 formed between a straight line L1 connecting the two eye detection cameras 8a, 8b in the known positions and a straight line connecting the respective eye detection cameras 8a, 8b and the eyes of the vehicular driver M are thereby specified. Then, based on the length of the straight line L1, and the angles θ1, θ2, the positions of the eyes of the vehicular driver M relative to the eye detection cameras 8a, 8b are specified using trigonometry. Only the position of either one of both eyes of the vehicular driver M can be specified, or the positions of the both eyes can be respectively specified. In a case where the positions of the both eyes are specified, for example, a position of a midpoint of the line connecting the both eyes is calculated, and the position of the midpoint is handled as the positions of the eyes of the vehicular driver M. Also, in a case where either one eye is used preferentially for driving (such as a case where the other eye of the vehicular driver M is damaged or a case where an attempt is made to visually recognize an image with a dominant eye, for example), it is preferable that the shading device 1 of the embodiment have an auxiliary unit that switches from a setting based on the both eyes to a setting based on one eye, and that specifies which of the right eye and the left eye is used, and information input to the auxiliary unit is used for data processing by a display target data selection circuit 53. A method of utilizing the result of detection of the second detector 8 will be described later.

In FIG. 10, the essential constituent elements of the shading device 1 of the embodiment are shown in a block diagram. The image pickup data generated by the image pickup device 4 is sent to the data processing circuit 5. The display image data generated based on the image pickup data by the data processing circuit 5 is sent to the display apparatus 3, and the image based on the display image data is displayed on the display portion 3a of the display apparatus 3. The first detector 6 and the third detector 9 described previously are connected to the control circuit 7. The first detector 6 is connected to the data processing circuit 5 as well, together with the second detector 8. Although in FIG. 10 the second display apparatus 39 and the second image pickup device 42 (see FIG. 8) are not shown, the second display apparatus 39, like the display apparatus 3, can be connected to the data processing circuit 5 and the control circuit 7, and the second image device 42, like the image pickup device 4, can be connected to the data processing circuit 5.

The control circuit 7 is connected to the display apparatus 3 so as to control the ON/OFF state of the display apparatus 3 based on a result of detection of the first and/or third detectors 6, 9. The control circuit 7 can be configured with a combination of a comparator or some gate elements, for example. The control circuit 7 can also be composed of a portion of a microcomputer or a gate array, and can be comprised in the data processing circuit 5. FIG. 10 is merely provided as an example of a configuration of the shading device 1 in the embodiment, and the shading device 1 does not necessarily have to comprise all of the constituent elements shown in FIG. 10 or can further comprise a constituent element not shown in FIG. 10. In addition, an internal configuration of the data processing circuit 5 is not construed to be limitative to those shown in FIG. 10.

The data processing circuit 5 constitutes circuit blocks having their own functions. This circuit comprises a data generation circuit 50, an angle identification circuit 51, a data correction circuit 52, a display target data selection circuit 53, a memory circuit 54, a comparison circuit 55, and a display image highlighting circuit 56. The display target data selection circuit 53 is provided with a memory circuit 53a. These circuit blocks can partially or entirely share a same circuit element. The data processing circuit 5 can be formed of a microcomputer or an ASIC, or an arbitrary semiconductor device for signal processing, such as FPGA, and its peripheral circuits. The microcomputer or the like operates in accordance with the software that defines given processing procedures. Each circuit block in the data processing circuit 5 can be individually formed using a semiconductor integrated circuit device or discrete semiconductor elements.

The data generation circuit 50 is a circuit block responsible for performing basic functions of the data processing circuit 5, and generates, based on image pickup data, as display image data, a drive signal including information related to light emission intensity and light emission timing for each pixel of the display apparatus 3. The data generation circuit 50 is used to generate a drive signal of an organic EL display panel or the like, for example, and can be a so-called timing controller and its peripheral circuits that operate in accordance with the software that defines given processing procedures.

Referring to FIGS. 11A, 11B, 12A, and 12B, functions of the angle identification circuit 51 and the data correction circuit 52 will be described below. The angle identification circuit 51 identifies an angle θA of the surface (first surface) 2a of the shading member 2 relative to the line of vision of the vehicular driver M facing the shading member 2, based on a result of detection of the first detector 6 and a result of detection of the second detector 8. As described previously, the first detector 6 can detect the position in the rotating direction of the shading member 2. Therefore, a position relationship between the shading member 2 and two eye detection cameras 8a, 8b that are present at the known positions can be specified from the result of detection of the first detector 6 as well. The second detector 8 can also detect the positions of the eyes of the vehicular driver M relative to the eye detection cameras 8a, 8b (see FIG. 9). Hence, the positions of the eyes of the vehicular driver M relative to the shading member 2 are specified as well, and consequently, the direction of the eyes I of the vehicular driver M seeing the shading member 2 can be specified. That is, based on the result of detection of the first detector 6 and the result of detection of the second detector 8, the angle θA of the first surface 2a of the shading member 2 can be specified relative to the line of vision I of the vehicular driver M facing the shading member 2. The angle identification circuit 51 operates in accordance with the software or the like including the procedures for specifying the angle θA in this manner, for example.

Figure 11A:
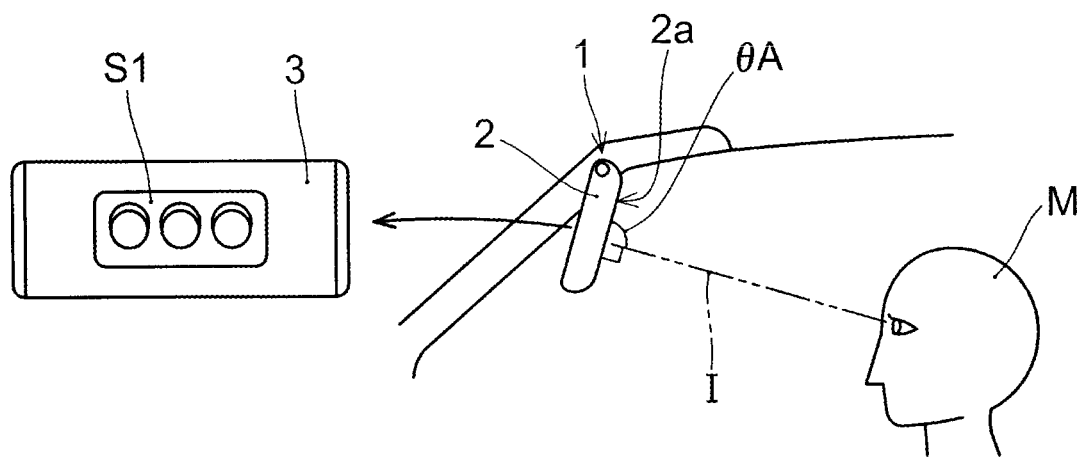
FIG. 11A shows an example of an angle between the shading member of the shading device of the first embodiment and an operator's line of vision.
Figure 11B:
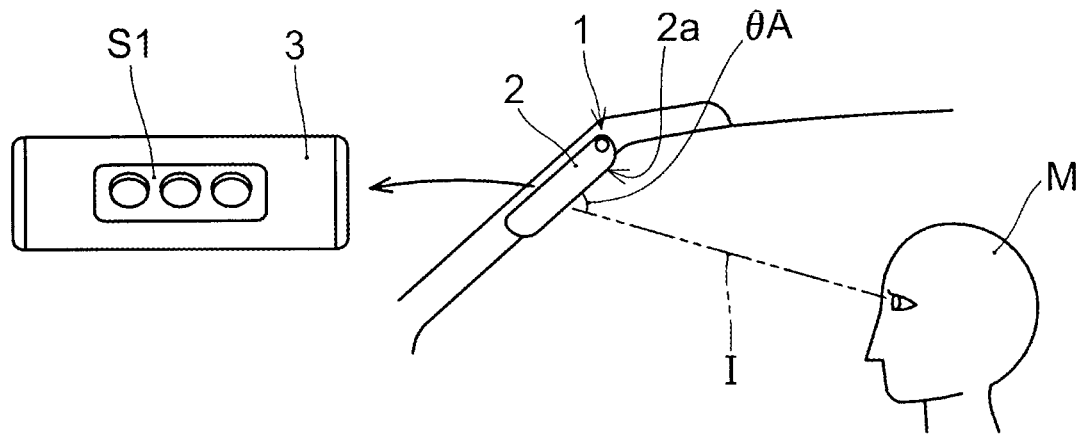
FIG. 11B shows another example of the angle between the shading member of the shading device of the first embodiment and the operator's line of vision.

The data correction circuit 52 corrects image pickup data based on a difference Δθ in an angle θA relative to a given reference angle (next, a description will be given assuming that the reference angle is 90 degrees). As shown in FIG. 11A, in a case where the angle θA is 90 degrees (the angle Δθ is zero and the first surface 2a of the shading member 2 and the line of vision I are orthogonal to each other), as exemplified in the left-side view in FIG. 11A, an image of traffic lights S1 displayed on the display apparatus 3 is grasped by the eyes of the vehicular driver in a generally proper manner. However, as shown in FIG. 11B, in a case where the angle θA is an angle other than 90 degrees, as shown in the left-side view in FIG. 11B, the image of the traffic lights S1 is grasped by the eyes of the vehicular driver M in a shape in which the image is reduced and distorted in the vertical direction. The data correction circuit 52 corrects image pickup data so that the image displayed on the display apparatus 3 can be properly grasped by the eyes of the vehicular driver M even in the state as shown in FIG. 11B, based on the difference Δθ between the given reference angle and the angle θA.

For example, the data correction circuit 52 replaces, with data of a pixel one up from a center pixel, data of a pixel two up from the center pixel in the vertical direction of a region displayed on the display apparatus 3 of image pickup data. Data of a pixel three up from the center pixel and data of a pixel four up therefrom are also replaced with data of a pixel two up from the center pixel (data before being replaced as described previously). The data correction circuit 52 performs such data correction relative to the image pickup data corresponding to the region displayed on the display apparatus 3. By performing such correction, the image displayed on the display apparatus 3 can be enlarged to twice in the vertical direction. The magnification for enlarging the display image in the vertical direction is selected based on the difference Δθ in the angle θA relative to the given reference angle. For example, the display image is enlarged in the vertical direction at a higher magnification, as the angle θA of the first surface 2a of the shading member 2 relative to the line of vision of the vehicular driver M departs from 90 degrees.

Figure 12A:
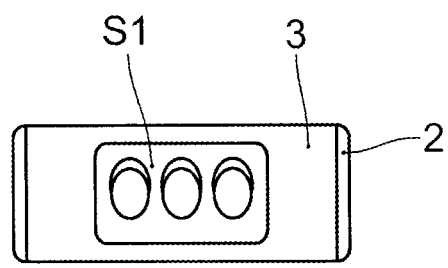
FIG. 12A shows a display image corrected by a data correction circuit of the shading device according to the first embodiment.
Figure 12B:
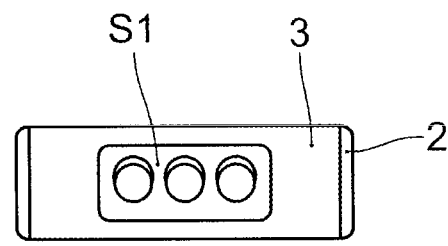
FIG. 12B shows the display image of FIG. 12A in a shape seen in the eyes of the operator.

The data processing circuit 5 generates display image data in the data generation circuit 50 based on image pickup data corrected by the data correction circuit 52. By doing so, for example, on the actual display apparatus 3, the image enlarged in the vertical direction is displayed as shown in FIG. 12A. As shown in FIG. 12B, however, this enlarged image can be grasped by the vehicular driver as an image of which shape is close to a shape of an essential display target (traffic lights S1 in FIG. 12B). It is considered to be easy for the vehicular driver to recognize a display target. The data correction circuit 52 can perform correction relative to the display image data generated by the data generation circuit 50.

Figure 13:
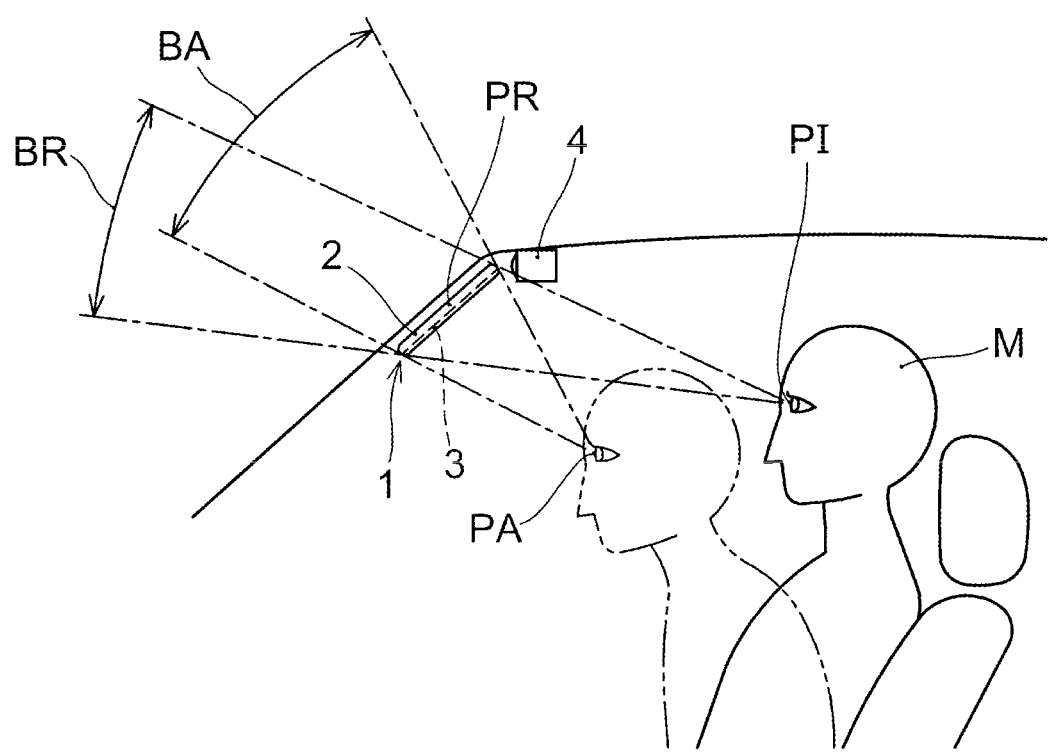
FIG. 13 shows an example of a blind spot portion of the operator by the shading member of the shading device according to the first embodiment.
Figure 14:
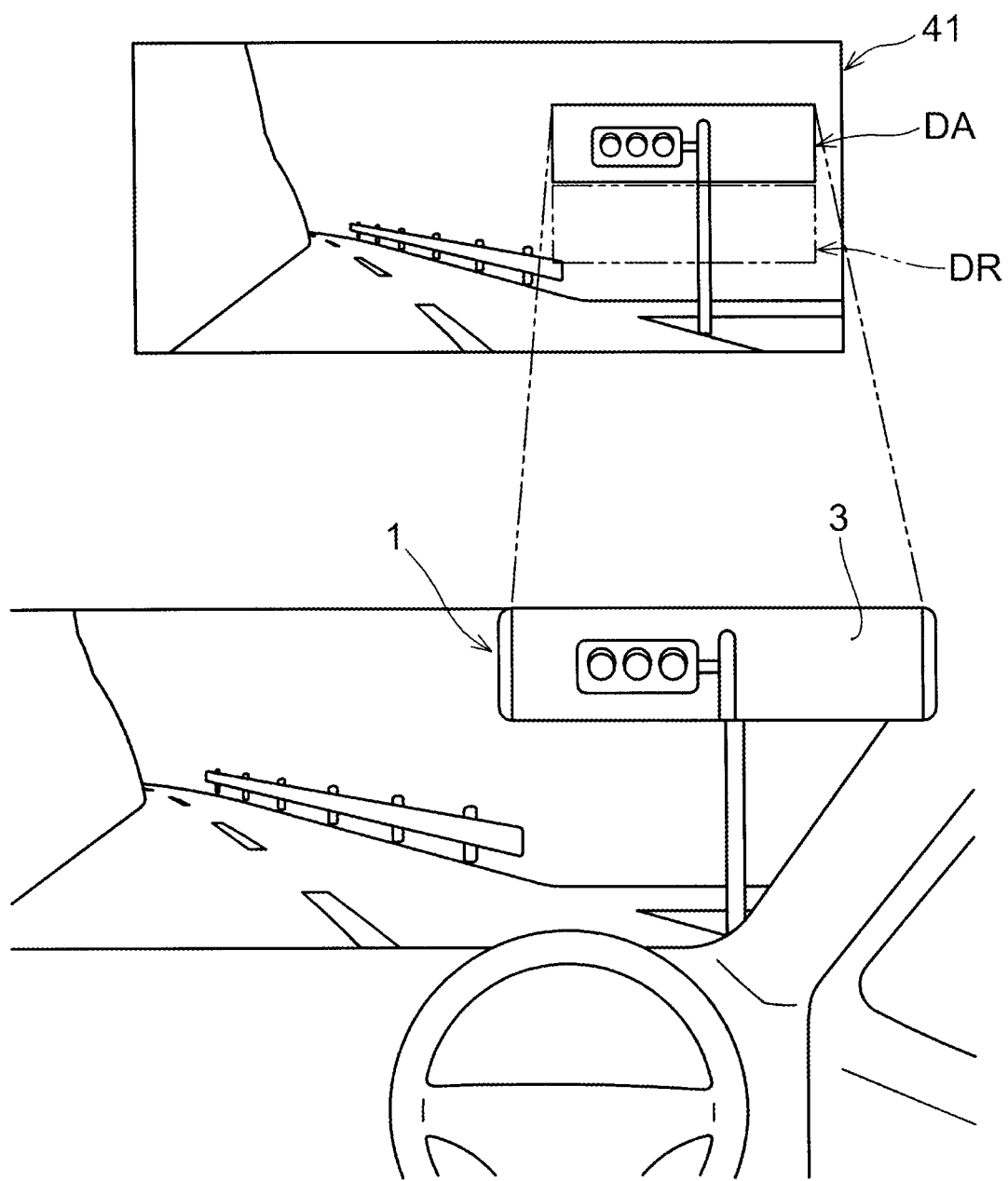
FIG. 14 shows an example of a display image corresponding to the blind spot portion of the operator by the shading member of the shading device according to the first embodiment.

Next, referring to FIG. 13 and FIG. 14, functions of the display target data selection circuit 53 (see FIG. 10) will be described. As shown in FIG. 13, the positions of the eyes of the vehicular driver M move according to a change or the like of the vehicular driver's posture. Therefore, in the field of vision of the vehicular driver M, a blind spot portion produced by the shading member 2 can also change any time. It is considered to be preferable to cause the display apparatus 3 to display only the view of the blind spot portion in light of the fact that the image is grasped by the eyes of the vehicular driver M without having an unnatural feeling.

As shown in FIG. 13, if the reference position PR of the shading member 2 and the reference position PI of the eyes of the vehicular driver M are assumed, based on these and the size of the shading member 2, the blind spot portion (reference blind spot portion BR) in the image pickup region of the image pickup device 4 is defined. The image pickup region is fixedly defined by the position or characteristics of the image pickup device 4. If the positions of the shading member 2 and the eyes of the vehicular driver M are fixed, only the view of the blind spot portion in the image pickup data is always displayed on the display apparatus 3 by defining, as a display target region, a region (reference display target region) corresponding to the reference blind spot portion BR. However, the positions of the shading member 2 and the eyes of the vehicular driver M move, and the blind spot portion thereby varies. Thus, it is preferable to change the display target region according to the variation of the blind spot portion. The display target data selection circuit 53, for the sake of such display, determines the blind spot portion obstructed by the shading member 2 in the field of vision of the operator of the shading member 2 (vehicular driver M in the embodiment) and then selects the display target data among the image pickup data, the selected display target data corresponding to the blind spot portion.

The first detector 6 and the second detector 8 are connected to the display target data selection circuit 53 (see FIG. 10). Therefore, information about the position of the shading member 2 and the positions of the eyes of the vehicular driver M is input to the display target data selection circuit 53. The display target data selection circuit 53 is also provided with a memory circuit 53a (see FIG. 10). In the memory circuit 53a, information related to a difference between a blind spot portion BA produced by being obstructed by the shading member 2 and the reference blind spot portion BR is stored for each of a variety of positions and/or angles of the shading member 2 and the positions of the eyes of the vehicular driver M. In FIG. 13, as an example, the blind spot portion BA when the eyes of the vehicular driver M are present at the position PA is shown. For example, in the memory circuit 53a, the movement quantity in the vertical direction and the transverse direction relative to the reference blind spot portion BR and an enlargement rate or a reduction rate or the like, which are required to obtain a position of the actual blind spot portion BA, are stored. The display target data selection circuit 53 specifies the position of the actual blind spot portion BA by way of numeric calculation or the like, based on the information about the position of the shading member 2 and the positions of the eyes of the vehicular driver M from the first and second detectors 6, 8 and on the storage contents of the memory circuit 53a. The display target data selection circuit 53 then selects the data of the region among the image pickup data, the selected data corresponding to the actual blind spot portion BA as the display target data to be a display target.

Then, the data generation circuit 50 generates display image data based on the selected display target data so as to cause the display apparatus 3 to display the view of the actual blind spot portion BA. Consequently, as shown in FIG. 14, an image of the display target region DA to be actually displayed, which has been changed for the reference display target region DR corresponding to the reference blind spot portion (which has been shifted upward in an example of FIG. 14) of the image pickup region 41 is displayed on the display apparatus 3. An image with less unnatural feeling in comparison with the view over the front windshield can be displayed on the display apparatus 3.

The display target data selection circuit 53 can have a function of cancelling fine shaking of image display caused by a slight relative motion of the vehicular driver M relative to a vehicle body. For example, the display target data selection circuit 53 can be configured to increase the period of sampling information from the second detector 8, in a case where the information from the second detector 8 (see FIG. 10) varies frequently at a given level or more. The display target data selection circuit 53 can also be configured so as not to newly start a selection operation of display target data, in a case where a position change of the eyes of the vehicular driver M fails to meet a given condition. In addition, a low pass filter can be provided at an input portion that receives information from the second detector 8 in the display target data selection circuit 53.

Figure 15:
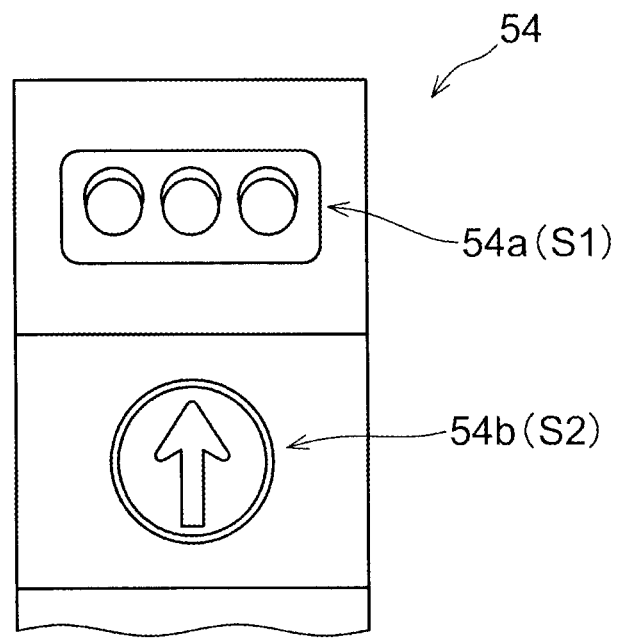
FIG. 15 conceptually shows an example of data stored in a memory circuit of the shading device according to the first embodiment.

Next, referring to FIGS. 15, 16A, and 16B, functions of the display image highlighting circuit 56, the comparison circuit 55, and the memory circuit 54 (see FIG. 10) will be described.

The memory circuit 54 stores reference data related to appearance features of a given target that can be picked up, as an image, by the image pickup device 4 (seer FIG. 1). In FIG. 15, an example of reference data 54a, 54b that are stored in the memory circuit 54 is conceptually shown as an image that can be reconstructed by the reference data 54a, 54b. That is, as shown in FIG. 15, in the memory circuit 54, the appearance features of objects such as traffic lights S1 and road sign S2 that are likely to be shot by the image pickup device 4 are stored as data. For example, in the memory circuit 54, image pickup data generated by actually shooting the traffic lights S1 by the image pickup device 4 is stored. Alternatively, the shape of the traffic lights S1 or the like is modeled using unit elements such as microtriangles and the reference data 54a, 54b can be formed of the vertex coordinate of the respective unit elements. The reference data can be formed in an arbitrary method. The memory circuit 54, although not construed to be limitative in particular, is composed of an arbitrary semiconductor storage device such as an SRAM or a PROM, for example. A same storage device can be shared between this memory circuit and the memory circuit 53a of the display target data selection circuit 53 described previously.

The comparison circuit 55 compares the image pickup data generated by the image pickup device 4 and the reference data 54a, 54b that are stored in the memory circuit 54. The comparison circuit 55 can reconstruct the image pickup data and the reference data 54a, 54b as an image and then compare these items of data by a pattern recognition technique. Also, if the data formats of the image pickup data and the reference data 54a, 54b are the same as each other, both of the data can be sequentially compared with each other as actual data in bits or bytes. A method of comparison to be performed by the comparison circuit 55 is not construed to be limitative in particular. The comparison circuit 55 detects approximate image pickup data in a case where there is approximate image pickup data approximating either of the reference data 54a, 54b such that given criteria are met by comparison between the image pickup data and the reference data 54a, 54b.

The display image highlighting circuit 56, in a case where approximate image pickup data has been detected as a result of comparison of the comparison circuit 55, causes the display apparatus 3 to display a display image of a given target that is displayed based on the approximate image pickup data so as to be highlighted more significantly than any other display image. Specifically, the display image highlighting circuit 56 processes the display image data that is generated based on the approximate image pickup data, of the display image data generated by the data generation circuit 50 (see FIG. 10).

Figure 16A:
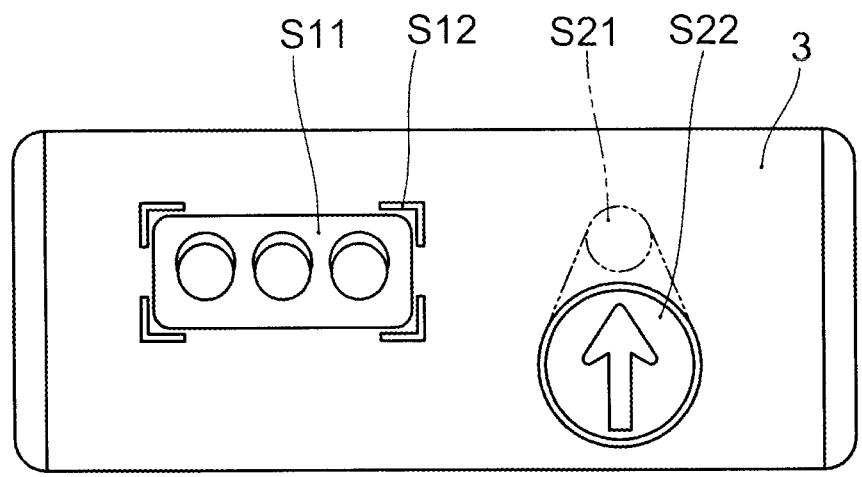
FIG. 16A shows an example of an image displayed to be highlighted by the shading device according to the first embodiment.
Figure 16B:
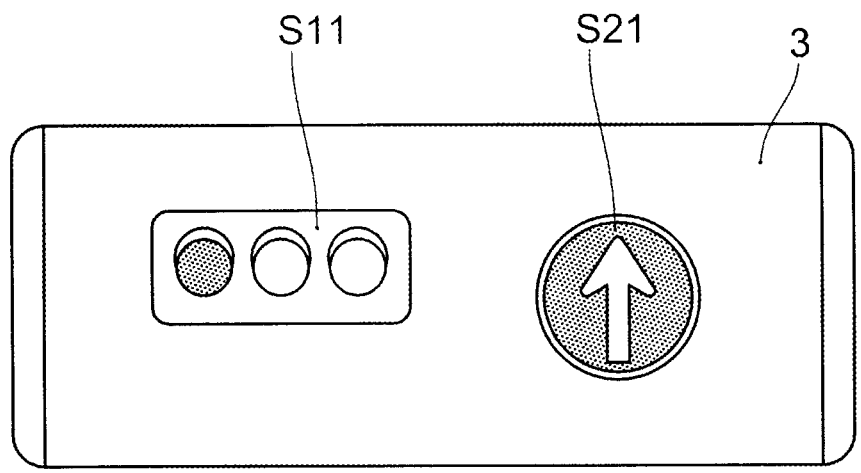
FIG. 16B shows another example of the image displayed to be highlighted by the shading device according to the first embodiment.

For example, the display image highlighting circuit 56 processes data of pixels around an image S11 of a highlighting target (traffic lights), as shown toward the left in the display apparatus 3 of FIG. 16A, and displays a frame S12 surrounding the image S11 so that the image S11 is highlighted. Also, as shown toward the right in the display apparatus 3 of FIG. 16A, the data of pixels around the image S21 of a highlighted target (road sign) is processed, and an enlarged image S22 of the image 21 can be displayed. In addition, the display image highlighting circuit 56, as shown in FIG. 16B, can increase the luminance of subpixels of a specific color so as to highlight the specific color (for example, red or blue) in the display images S11, S21 of the highlighted target.

Further, the display image highlighting circuit 56, in a case where approximate image pickup data has been detected, causes the display apparatus 3 to display, as a still image in a given time frame, an image to be displayed based on the image pickup data in which the approximate image pickup data is included. For example, the display image data generated by the data generation circuit 50 is recorded any time in a video memory (not shown). When approximate image pickup data has then been detected, the display image data to be sent to the display apparatus 3 can be switched from the display image data generated any time by the data generation circuit 50 to the display image data recorded in the video memory (not shown). The display image highlighting circuit 56 can highlight a specific image by an arbitrary method without being construed to be limitative thereto. By such highlighting, it is possible to increase the visibility relative to a target with a strong need to cause the vehicular driver M to recognize.

Figure 17:
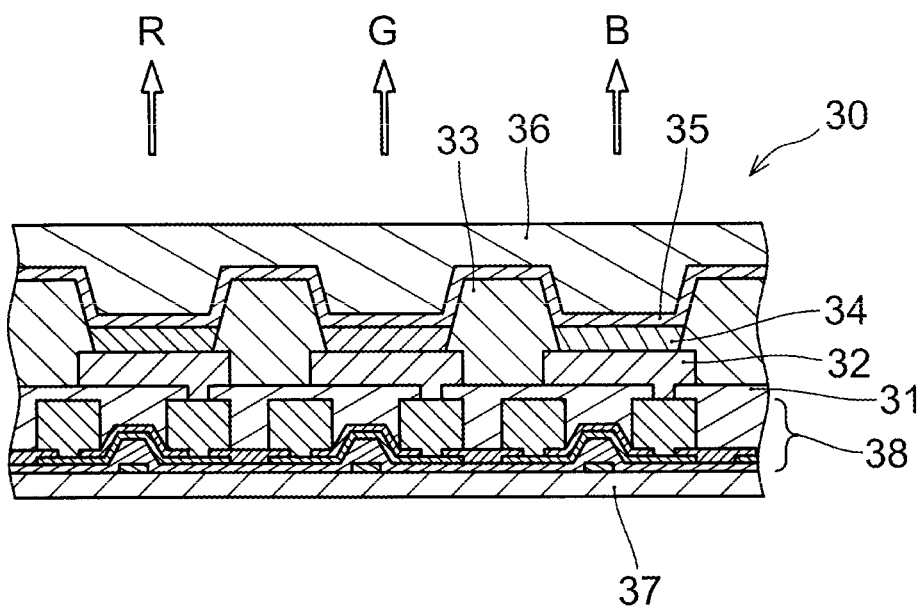
FIG. 17 shows a cross-sectional view of an example of a display apparatus in the shading device according to the first embodiment.

In FIG. 17, a cross-sectional view of one pixel of the organic EL display panel 30 constituting the display apparatus 3 of the shading device 1 is exemplified. On a flexible film 37 made of a resin or the like, a switching element such as a TFT 38 is formed for each of the sub pixels R, G, B, and, on a planarizing film 31 formed thereon, a first electrode (for example, anode) 32 is formed. The first electrode 32 is formed by a combination of a metal film such as Ag and an ITO film, and is connected to the switching element such as the TFT 38. Between subpixels, an insulation bank 33 made of $SiO_2$ is formed. In a region surrounded by the insulation bank 33, an organic layer 34 is vapor-deposited. Although in FIG. 17, the organic layer 34 is shown as one layer, the organic layer 34 can be actually formed of a plurality of layers of laminate film that are made of different organic materials.

A second electrode (for example, cathode) 35 is formed by vapor-depositing Mg and Ag or Al or the like on the whole surface of the organic layer 34. Further, on a surface of the second electrode 35, a protective film 36 made of $Si_3N_4$, for example, is formed. The elements shown in FIG. 17 are entirely sealed with a sealing layer made of a resin film (not shown) so that the organic layer 34 or the second electrode 35 does not absorb moisture or oxygen or the like. A cross-sectional structure shown in FIG. 17 is merely provided as an example, and the structure of the organic EL display panel 30 constituting the display apparatus 3 and materials of the respective constituent elements are not construed to be limitative to the structure and materials described here.

In the organic EL display panel 30 used in the shading device 1 of the embodiment, the first electrode 32 and the second electrode 35 are formed at substantially equal intervals in any of the respective subpixels R, G, B. In other words, the first electrode 32 and the second electrode 35 do not intentionally differentiate their intervals for subpixels of each color. On the other hand, in the organic EL display panel in general, in order to increase the intensity of light radiated in a perpendicular direction to a panel display surface, intervals of the anode and the cathode of each subpixel are made coincident with a wavelength of light of a color emitted from such subpixel so that the light emitted in the organic layer repeats reflection between the anode and the cathode (micro-cavity structure). That is, in a general organic EL display panel, the intervals between the anode and the cathode are different from each other for subpixel of each color.

On the contrary, in the shading device 1 of the embodiment, as described previously, the display apparatus 3 is seen by the vehicular driver M at an arbitrary angle. Therefore, it is not so useful to increase the intensity of light radiated in the perpendicular direction to the display surface of the display apparatus 3, and it is more important to make angle-of-view dependencies of the respective colors R, G, B coincident with each other so that the chromaticity does not change greatly even if the angle varies. Thus, the first electrode 32 and the second electrode 35 of the organic EL display panel 30 that is used in the shading device 1 of the embodiment do not utilize the micro-cavity effect, unlike the general organic EL display panel. For example, the first electrode 32 and the second electrode 35 can be spaced from each other by a substantially same distance among the respective subpixels R, G, B. In other words, the intervals between the cathode and the anode in each subpixel does not have to be coincident with a wavelength of light emitted from the subpixel. That is, the organic EL display panel 30 can comprise a plurality of subpixels, and each of the plurality of subpixels can comprise two electrodes disposed with a gap therebetween, the gap having a length, different from the wavelength of light emitted from each of the plurality of sub pixels.

In the foregoing embodiment, the shading device 1 of the embodiment has been described by way of example of a case in which the shading device is used for the front windshield of the motor vehicle. However, it is to be understood that the shading device 1 of the embodiment is not construed to be limitative to the front windshield, and is adaptable to the rear windshield of a motor vehicle, a windshield of an arbitrary vehicle, or windshields of other arbitrary vehicles or an arbitrary building, as described previously.

Figure 18:
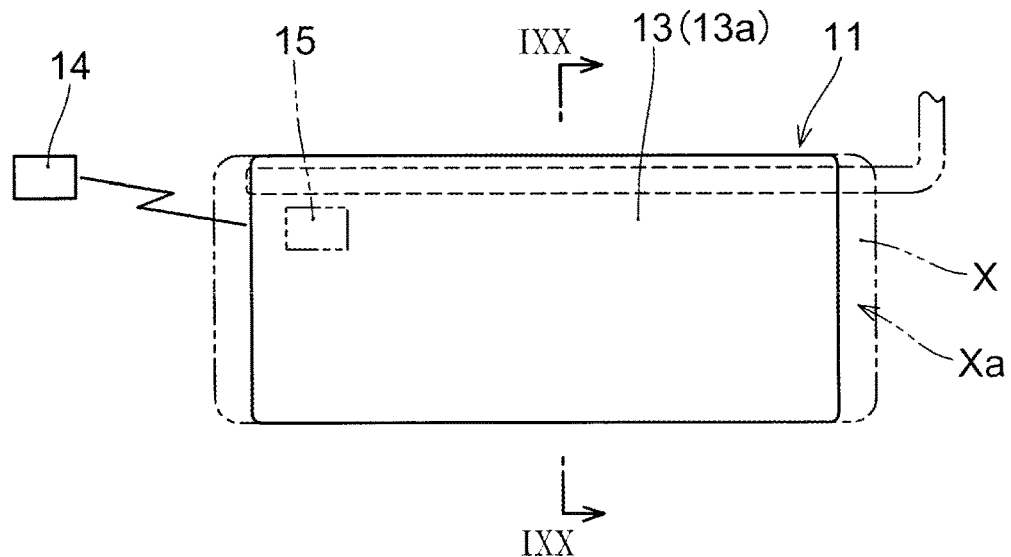
FIG. 18 shows a front view of an example of an image display module according to the first embodiment of the present invention.
Figure 19:
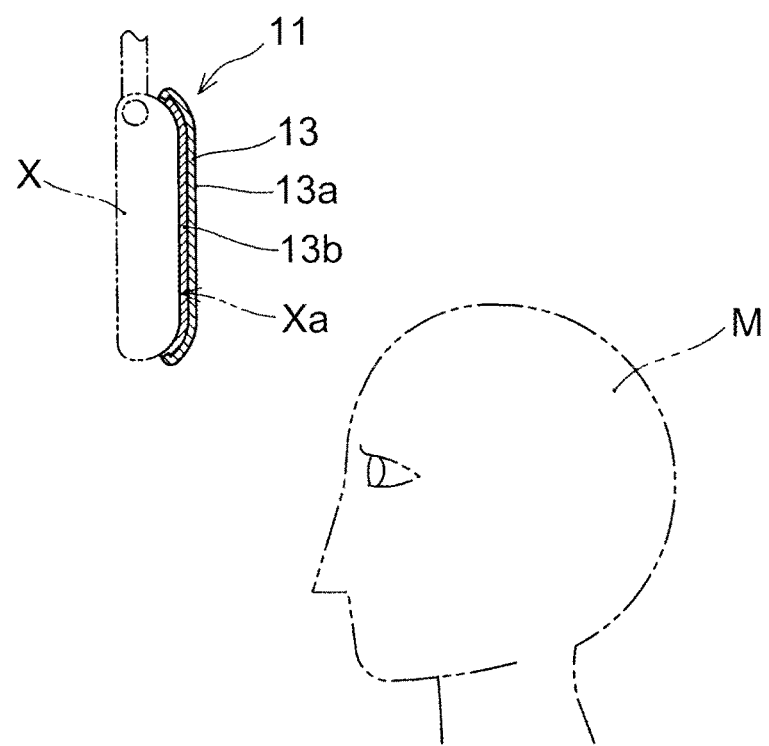
FIG. 19 is a cross-sectional view along a line IXX-IXX of FIG. 18.

In FIG. 18 and FIG. 19, an image display module 11 of the first embodiment of the present invention is shown. The image display module 11, in a substantially similar manner to the shading device 1, is provided with the constituent elements other than the shading member 2 of the shading device 1 (see FIG. 2) of the first embodiment described previously. That is, the image display module 11 is provided with a display apparatus 13 in which a display portion 13a is to be disposed to be facing an operator M. The display apparatus 13 is disposed on a surface Xa that is facing the operator M during use thereof in a shading device X that is not provided with a display apparatus or the like. The shading device X is not provided with the display apparatus 3, the image pickup device 4, or the data processing circuit 5 that is comprised in the shading device 1 of the first embodiment described above and thus is provided with only structures and functions equivalent to the shading member 2, and comprises a surface Xa that is facing the operator M when in use. Further, the image display module 11 is provided with: an image pickup device 14 that picks up, as an image, a region which an opposite surface of the surface Xa of the shading device X faces, and that generates image data; and a data processing circuit 15 that generates display image data to be displayed on the display portion 13a during use of the shading device X, based on the image pickup data generated by the image pickup device 14. According to the image display module 11 of the first embodiment, during use of the shading device X, a view including a region that is obstructed by the shading device X can be grasped by the operator's eyes of the shading device X.

The display apparatus 13, like the display apparatus 3 of the shading device 1 of the first embodiment, is preferably composed of an organic EL display panel or a liquid crystal display panel. The display apparatus 13 is used to be attached to the surface Xa of the shading device X during use of the shading device X. In FIG. 18 and FIG. 19, the display apparatus 13 is bonded to, and is fixed to, using an adhesive sheet, for example, the surface Xa of the shading device X having a curved surface portion in the vicinity of an end edge. The display apparatus 13 extends to the top of the curved surface part of the surface Xa. Therefore, the display apparatus 13 has flexibility. However, the display apparatus 13 can have rigidity. As shown in FIG. 19, the display apparatus 13 can be bonded to a supporting member 13b so as to have a certain mechanical strength even when it is not attached to the shading device X. The supporting member 13b is formed of an arbitrary synthetic resin or the like.

The image pickup device 14 and the data processing circuit 15 can be configured similarly to the image pickup device 4 and the data processing circuit 5 of the shading device 1 of the first embodiment. As shown in FIG. 18, the image pickup device 14 is connected to the display apparatus 13 (specifically the data processing circuit 15) in a wired or wireless manner. The image pickup device 14, unlike an example of FIG. 18, can be fixed to the display apparatus 13 while an imaging lens faces opposite a surface that faces the operator M of the display apparatus 13. The data processing circuit 15, in the example of FIG. 18, is provided in the supporting member 13b (in FIG. 18, the data processing circuit 15 is conceptually shown in a rectangular shape as a functional block). The data processing circuit 15, unlike the example of FIG. 18, can be provided separately from the display apparatus 13.

Each of the display apparatus 13, the image pickup device 14, and the data processing circuit 15 has features similar to those of the display apparatus 3, the image pickup device 4, and the data processing circuit 5 of the shading device 1 according to the first embodiment described previously, and is similarly operable. The image display module 11, like the shading device 1 of the first embodiment, can also be provided with first to third detectors. In addition, the data processing circuit 15, like the data processing circuit 5 of the shading device 1, can comprise a data generation circuit, an angle identification circuit, a data correction circuit, a display target data selection circuit, a memory circuit, a comparison circuit, and a display image highlighting circuit. These constituent elements are operable similarly to the constituent elements of the shading device 1 of the first embodiment. Therefore, a further description of the constituent elements of the image display module 11 of the first embodiment is not given here.

<Summary>

A shading device according to a first aspect of the present invention is characterized by comprising: a shading member, the shading member having a plate shape; a display apparatus disposed on a surface of the shading member, the surface being to face an operator during use of the shading member, in such a manner that a display portion faces the operator; an image pickup device to pick up, as an image, a region which an opposite surface of the surface faces, and generate image pickup data; and a data processing circuit to generate, based on the image pickup data generated by the image pickup device, display image data to be displayed on the display portion during use of the shading member.

According to the configuration of the first aspect of the present invention, even if sunlight directly illuminates a room or the like, the glare thereof is reduced by the shading member and a view comprising a region that is obstructed by the shading member can be grasped by the eyes of an operator of the shading device.

A shading device according to a second aspect of the present invention, in the first aspect, further comprises: a first detector to detect a position of the shading member capable of rotating; and a second detector to detect a position of an eye of an operator of the shading member, and is characterized in that the data processing circuit further comprises: an angle identification circuit to identify an angle of the surface of the shading member relative to a line of vision of the operator facing the shading member, based on a result of detection of the first detector and a result of detection of the second detector; and a data correction circuit to correct the image pickup data based on a difference of an angle of the surface relative to a given reference angle, and the data processing circuit can generate the display image data based on image pickup data corrected by the data correction circuit to cause the display apparatus to display a display image corrected for a difference of an angle of the surface relative to the given reference angle.

According to the configuration of the second aspect of the present invention, even if a shading member is positioned to be inclined relative to the line of vision of an operator, it is possible to cause a display apparatus to display an image easily recognizable by the operator.

In a shading device according to the third aspect of the present invention, in the second aspect, the data processing circuit further comprises a display target data selection circuit to determine a blind spot portion obstructed by the shading member in a field of vision of an operator of the shading member, and select display target data among the image pickup data, the display target data corresponding to the blind spot portion, and the data processing circuit can generate the display image data based on the display target data so as to cause the display apparatus to display a view of the blind spot portion.

According to the configuration of the third aspect of the present invention, even in a case where a blind spot portion produced by a shading member varies with movement of an operator, it is possible to cause a display apparatus to display an image with less unnatural feeling for the operator.

A shading device according to a fourth aspect of the present invention, in the second or third aspect, can further comprise a control circuit to control an ON/OFF state of the display apparatus based on a result of detection of the first detector.

According to the configuration of the fourth aspect of the present invention, an operator can cause a display apparatus to display an image or stop the display merely by operating a shading member.

A shading device according to a fifth aspect of the present invention, in any one of the second to fourth aspects, further comprises a third detector to detect a position of the shading member, wherein the third detector is a detector that detects the position of the shading member in a direction different from a direction of a position change of the shading member, wherein the position change of the shading member is a change being detectable with the first detector, and the control circuit can control an ON/OFF state of the display apparatus based on results of detection of the first detector and the third detector.

According to the configuration of the fifth aspect of the invention, for example, even if a shading member is positioned in a use position, in a case where a display portion of a display apparatus cannot face an operator, the operator can stop display of the display apparatus merely by operating the shading member.

In a shading device according to a sixth aspect of the present invention, in any one of the first to fifth aspects, the shading member comprises a curved surface portion, and the display apparatus can be formed along a curved surface of the curved surface portion.

According to the configuration of the sixth aspect of the present invention, it is possible to increase visibility in a case where an operator sees a display portion of a display apparatus in an oblique direction.

In a shading device according to a seventh aspect of the present invention, in the sixth aspect, the shading member comprises the curved surface portion at an edge oriented to an upper side and/or an edge oriented to a lower side during use of the shading member, and the curved surface portion can have a curvature radius of 5 mm or more and 20 mm or less.

According to the configuration of the seventh aspect of the present invention, it is possible to effectively increase visibility in a case where an operator sees a display portion of a display apparatus in an oblique direction.

In a shading device according to an eighth aspect of the present invention, in the sixth aspect, the entirety of the surface of the shading member is a curved surface, and the surface can have a curvature radius of 50 mm or more and 250 mm or less.

According to the eighth aspect of the present invention, it is possible to effectively increase visibility in a case where an operator sees a display portion of a display apparatus in an oblique direction.

In a shading device according to a ninth aspect, in any one of the first to eighth aspects, the display apparatus can be an organic EL display panel formed using a flexible film having a surface on which an organic material has been laminated.

According to the configuration of the ninth aspect of the present invention, a degree of freedom in design of a surface shape of a shading member is increased making it possible to increase visibility in a case where an operator sees a display portion of a display apparatus in an oblique direction.

In a shading device according to a tenth aspect of the present invention, in the ninth aspect, the organic EL display panel comprises a plurality of subpixels, and each of the plurality of subpixels can comprise two electrodes disposed with a gap therebetween, the gap having a length different from a wavelength of light emitted from each of the plurality of subpixels.

According to the configuration of the tenth aspect of the present invention, an image can be displayed with uniform image quality over a wide angular region relative to a display surface of a display apparatus.

In a shading device according to an eleventh aspect of the present invention, in any one of the first to tenth aspects, the data processing circuit can further have: a memory circuit to store reference data related to an appearance feature of a given target; a comparison circuit to compare the image pickup data and the reference data; and a display image highlighting circuit to process the display image data so as to highlight a display image of the given target displayed on the display apparatus more significantly than other display images.

According to the configuration of the eleventh aspect of the present invention, it is possible to increase visibility relative to a target with a great need to cause an operator to recognize, and it is also possible to reduce oversight of such a target by the operator.

In a shading device according to a twelfth aspect of the present invention, in any one of the first to eleventh aspects, the shading member can comprise an infrared-ray reflective member on at least the opposite surface of the surface in the shading member.

According to the configuration of the twelfth aspect of the present invention, it is possible to prevent deterioration of characteristics of a display apparatus that is caused by heat.

In a shading device according to a thirteenth aspect of the present invention, in any one of the first to twelfth aspects, the image pickup device can comprise a lens having a surface on which a coating layer to reduce reflection of light by adjusting a refractive index is formed.

According to the configuration of the thirteenth aspect of the present invention, even in a case where imaging by an image pickup device is performed against sunlight, an image with less flare or ghosting can be displayed on a display apparatus.

An image display module according to a fourteenth aspect of the present invention is characterized by comprising: a display apparatus to be disposed on a surface of a shading device, the surface being to face an operator during use of shading device, in such a manner that a display portion faces the operator; an image pickup device to pick up, as an image, a region to which an opposite surface of the surface faces, and generates image pickup data; and a data processing circuit to generate display image data to be displayed on the display portion during use of the shading device, based on the image pickup data generated by the image pickup device.

According to the configuration of the fourteenth aspect of the present invention, even in a case where a shading device which does not comprise a display apparatus is used, a view comprising a region that is obstructed by the shading device can be grasped by an eye of an operator of the shading device.

DESCRIPTION OF REFERENCE NUMERAL

1 Shading device
2 Shading member
2a Surface (first surface)
2b Opposite surface (second surface)
3 Display apparatus
3a Display portion
30 Organic EL display panel
34 Organic layer
37 Flexible film
39 Second display apparatus
4 Image pickup device
4a Coating layer
41 Image pickup region
42 Second image pickup device
5 Data processing circuit
50 Data generation circuit
51 Angle identification circuit
52 Data correction circuit
53 Display target data selection circuit
53a Memory circuit
54 Memory circuit
54a, 54b Reference data
6 First detector
7 Control circuit
8 Second detector
8a, 8b Eye detection cameras
9 Third detector
11 Image display module
13 Display apparatus
14 Image pickup device
15 Data processing circuit
B Blind spot portion
BA Actual blind spot portion
BR Reference blind spot portion
C Motor vehicle
DR Reference display target region
DA Actual display target region
M Vehicular driver (operator)
P0 Non-use position
P1, P2 Use positions

The invention claimed is:

1. A shading device comprising:
a shading member, the shading member having a plate shape;
a display apparatus disposed on a surface of the shading member, the surface being to face an operator during use of the shading member, in such a manner that a display portion faces the operator;
an image pickup device to pick up, as an image, a region which an opposite surface of the surface faces, and generate image pickup data;
a data processing circuit to generate display image data to be displayed on the display portion during use of the shading member, based on the image pickup data generated by the image pickup device,
a first detector to detect a position of the shading member capable of rotating; and
a second detector to detect a position of an eye of the operator of the shading member, wherein
the data processing circuit further comprises:
an angle identification circuit to identify an angle of the surface of the shading member relative to a line of vision of the operator facing the shading member, based on a result of detection of the first detector and a result of detection of the second detector; and
a data correction circuit to correct the image pickup data based on a difference of an angle of the surface relative to a given reference angle, and
the data processing circuit generates the display image data based on image pickup data corrected by the data correction circuit to display, on the display apparatus, a display image corrected for the difference of the angle of the surface relative to the given reference angle.

2. The shading device according to claim 1, wherein
the data processing circuit further comprises a display target data selection circuit to determine a blind spot portion obstructed by the shading member in a field of vision of the operator of the shading member, and select display target data among the image pickup data, the display target data corresponding to the blind spot portion; and the data processing circuit generates the display image data based on the display target data so as to cause the display apparatus to display a view of the blind spot portion.

3. The shading device according to claim 1, further comprising
a control circuit to control an ON/OFF state of the display apparatus based on a result of detection of the first detector.

4. The shading device according to claim 3, further comprising a third detector to detect a position of the shading member, wherein
the third detector is a detector to detect a position of the shading member in a direction different from a direction of a position change of the shading member, wherein the position change of the shading member is a change being detectable with the first detector; and
the control circuit controls the ON/OFF state of the display apparatus based on results of detection of the first detector and the third detector.

5. The shading device according to claim 1, wherein the shading member comprises a curved surface portion, and the display apparatus is formed along a curved surface of the curved surface portion.

6. The shading device according to claim 5, wherein the shading member comprises the curved surface portion at an edge oriented to an upper side and/or an edge oriented to a lower side during use of the shading member, and the curved surface portion has a curvature radius of 5 mm or more and 20 mm or less.

7. The shading device according to claim 5, wherein the entirety of the surface of the shading member is a curved surface, and the surface has a curvature radius of 50 mm or more and 250 mm or less.

8. The shading device according to claim 1, wherein the display apparatus is an organic EL display panel formed using a flexible film having a surface on which an organic material is laminated.

9. The shading device according to claim 8, wherein
the organic EL display panel comprises a plurality of subpixels, and
each of the plurality of subpixels comprises two electrodes disposed with a gap therebetween, the gap having a length different from a wavelength of light emitted from each of the plurality of subpixels.

10. The shading device according to claim 1, wherein the data processing circuit further comprises:
a memory circuit to store reference data related to an appearance feature of a given target;
a comparison circuit to compare the image pickup data and the reference data; and
a display image highlighting circuit to process the display image data so as to highlight a display image of the given target displayed on the display apparatus more significantly than other display images.

11. The shading device according to claim 1, wherein the shading member comprises an infrared-ray reflective member at least on the opposite surface of the surface in the shading member.

12. The shading device according to claim 1, wherein the image pickup device comprises a lens having a surface on which a coating layer to reduce reflection of light by adjusting a refractive index is formed.

13. An image display module comprising:
a display apparatus to be disposed on a surface of a shading device according to claim 1, the surface being to face an operator during use of the shading device, in such a manner that a display portion faces the operator;
an image pickup device to pick up, as an image, a region to which an opposite surface of the surface faces, and generate image pickup data; and
a data processing circuit to generate display image data to be displayed on the display portion during use of the shading device, based on the image pickup data generated by the image pickup device, wherein
the data processing circuit comprises:
an angle identification circuit to identify an angle of the surface of the shading device relative to a line of vision of the operator facing the shading device, based on a position of the shading device and a position of an eye of the operator each input to the data processing circuit; and
a data correction circuit to correct the image pickup data based on a difference of an angle of the surface relative to a given reference angle, and
the data processing circuit generates the display image data based on image pickup data corrected by the data correction circuit to display, on the display apparatus, a display image corrected for the difference of the angle of the surface relative to the given reference angle.

* * * * *